(12) United States Patent
Helling et al.

(10) Patent No.: US 11,799,392 B2
(45) Date of Patent: Oct. 24, 2023

(54) LOW-VOLT DECOUPLING FROM A MODULAR ENERGY STORE CONVERTER SYSTEM

(71) Applicant: Universitaet der Bundeswehr Muenchen, Neubiberg (DE)

(72) Inventors: Florian Helling, Munich (DE); Thomas Weyh, Munich (DE); Arthur Singer, Munich (DE)

(73) Assignee: Universitaet der Bundeswehr Muenchen, Neubiberg (DE)

( * ) Notice: Subject to any disclaimer, the term of this patent is extended or adjusted under 35 U.S.C. 154(b) by 977 days.

(21) Appl. No.: 16/473,666

(22) PCT Filed: Dec. 21, 2017

(86) PCT No.: PCT/EP2017/084086
§ 371 (c)(1),
(2) Date: Jun. 26, 2019

(87) PCT Pub. No.: WO2018/122094
PCT Pub. Date: Jul. 5, 2018

(65) Prior Publication Data
US 2020/0014310 A1      Jan. 9, 2020

(30) Foreign Application Priority Data
Dec. 27, 2016   (DE) .................... 10 2016 125 720.6

(51) Int. Cl.
*B60L 1/00*    (2006.01)
*H02M 7/483*   (2007.01)
(Continued)

(52) U.S. Cl.
CPC .............. *H02M 7/483* (2013.01); *B60L 1/00* (2013.01); *B60L 58/22* (2019.02); *H02J 7/0013* (2013.01);
(Continued)

(58) Field of Classification Search
CPC ....... H02M 7/483; H02M 7/4835; B60L 1/00; B60L 58/22; B60L 58/18; B60L 58/19; H02J 7/0013
See application file for complete search history.

(56) References Cited

U.S. PATENT DOCUMENTS 8,885,374 B2    11/2014  Zhang et al.
2011/0109285 A1  5/2011  El-Barbar et al.
(Continued)

FOREIGN PATENT DOCUMENTS

DE   102013203734 A1   9/2014
DE   102014216470 A1   2/2016
(Continued)

OTHER PUBLICATIONS

Hillers et al. "Optimal Design of the Modular Multilevel Converter for an Energy Storage System Based on Split Batteries." IEEE 2013 15th European Conference on Power Electronics and Applications (EPE), published Oct. 17, 2013.
(Continued)

*Primary Examiner* — Jason D Shanske
*Assistant Examiner* — James J Triggs
(74) *Attorney, Agent, or Firm* — Eschweiler & Potashnik, LLC

(57) ABSTRACT

The invention discloses a module energy store converter system (10) comprising the following: at least one converter arm (12) comprising a plurality of standard modules (14) connected in series, and at least one extra-low voltage module (ELV module) (40), wherein the standard modules (14) and the ELV module can be connected such that inputs (48) of a transducer (46) of the ELV module can be optionally connected to the storage element (26) of an adjacent standard module (14) serially and/or anti-serially, or the transducer (46) can be decoupled from the storage element
(Continued)

(26), and/or the inputs (48) of the transducer (46) can be optionally connected to the storage element of an adjacent standard module (14) in parallel, or the transducer (46) can be decoupled from the storage element (26).

42 Claims, 18 Drawing Sheets

(51) Int. Cl.
  *B60L 58/22* (2019.01)
  *H02J 7/00* (2006.01)
  *H02M 3/335* (2006.01)
(52) U.S. Cl.
  CPC ..... *H02M 3/33569* (2013.01); *H02M 7/4835* (2021.05)

(56) References Cited

U.S. PATENT DOCUMENTS

| | | | |
|---|---|---|---|
| 2013/0094264 A1 | 4/2013 | Crookes et al. | |
| 2014/0049230 A1* | 2/2014 | Weyh | H02M 7/49 323/207 |
| 2015/0104821 A1* | 4/2015 | Goetz | G16B 5/30 600/300 |
| 2016/0190924 A1 | 6/2016 | Koyanagi et al. | |
| 2016/0368392 A1 | 12/2016 | Braun et al. | |
| 2017/0207631 A1 | 7/2017 | Helling et al. | |
| 2017/0250621 A1 | 8/2017 | Townsend et al. | |
| 2018/0043789 A1 | 2/2018 | Goetz | |
| 2018/0062498 A1 | 3/2018 | Fujii et al. | |
| 2020/0014310 A1* | 1/2020 | Helling | H02M 3/33569 |

FOREIGN PATENT DOCUMENTS

| | | |
|---|---|---|
| DE | 102015205278 A1 | 9/2016 |
| WO | 2012038031 A1 | 3/2012 |
| WO | 2016174117 A1 | 11/2016 |

OTHER PUBLICATIONS

Mohammadi et al. A Transformerless Medium-Voltage STATCOM Topology Based on Extended Modular Multilevel Converters. IEEE, Transactions on Power Electronics, vol. 26, No. 5, published May 2011.
Peftitis et al. "Auxiliary Power Supply for Medium-Voltage Modular Multilevel Converters." IEEE 2015 17th European Conference on Power Electronics and Applications (EPE'15 ECCE-Europe), published Sep. 8, 2015.
Iyer et al. "Multi-Level Converter to Interface Low Voltage DC to 3-Phase High Voltage Grid With Medium Frequency Transformer Isolation." IEEE IECON 2014—40th Annual Conference of the IEEE Industrial Electronics Society, published Oct. 29, 2014.
International Search Report dated Apr. 19, 2018 for International Application No. PCT/EP2017/084086.
International Preliminary Report on Patentability dated Jul. 2, 2019 for International Application No. PCT/EP2017/084086.

* cited by examiner

LOW-VOLT DECOUPLING FROM A MODULAR ENERGY STORE CONVERTER SYSTEM

This Application is a National Phase Entry of PCT/EP2017/084086, filed on Dec. 21, 2017, which claims priority to German Application number 10 2016 125 720.6, filed on Dec. 27, 2016. The contents of the above-referenced Patent Applications are hereby incorporated by reference in their entirety.

FIELD OF THE INVENTION

The present invention is in the field of electrical engineering. In particular, it relates to a modular energy store converter system, which contains at least one converter arm comprising a plurality of cascaded standard modules, as well as a vehicle and a method, which make use of such a modular energy store direct converter system.

BACKGROUND OF THE INVENTION

Battery systems are gaining increased importance in many areas of technology. A particularly important application relates to electric vehicles, in which the battery systems are a key component for the mobility of the future.

Many of the energy storage systems currently in use consist of a series connection or parallel connection of up to thousands of energy storage elements, wherein a relatively small voltage in comparison to the required total voltage is applied, or can be applied to each energy storage element. By using a series connection, the individual voltages add up to produce the total voltage. Using a parallel connection means that the charge is summed. For example, in an electric car such as the Tesla Model S, approx. 6,000 battery cells are installed. The cell voltages and the electrical properties of the cells strongly depend on the cell technology that is used. The cell voltages of typical systems range from 1.0 volts to 4.2 volts.

Due to slightly different physical properties of the cells, they differ with regard to their capacities and their ageing behaviour. Due to the different voltages of the individual cells obtained as a result, in current battery systems it is necessary to balance out the charges of all cells in order to increase the total capacity of the battery system. For performing this balancing, so-called battery management systems (BMS) are currently used, which effect an active or passive balancing. However, such known battery management systems are comparatively complex, lossy, usually expensive and under certain circumstances even damaging to the cells.

In order to make the energy of the battery system usable for a consumer, for example an electric motor, a power-electronic converter is also required, which is used to stabilize the output voltage or to generate a desired phase of an AC voltage. Furthermore, to charge the battery system a further converter, a so-called charge converter, is usually required.

The state of the art in battery systems has a number of disadvantages. One disadvantage is that the operating points of the system either cannot be adapted to the current requirements at all, or only to a small extent, and that the overall power of the system is typically limited by the weakest sub-unit in the assembly.

In the case of BMS which are based on a passive balancing of the energy storage cells, energy is knowingly wasted by electrical energy being converted into thermal energy and dissipated. This is also especially the case with passive balancing, so that the weakest cell in the assembly determines the total capacity, for example by making the termination of a charging or discharging process necessary.

BMS with more active balancing are usually based on the principle that energy is shifted by charge transfer between cells. This charge transfer, however, is always accompanied by an energy loss and also reduces the service life of the cells.

In the conventional systems it is typically also necessary that all cells in the system are of the same type and have the smallest possible differences in their electrical and physical characteristics. In addition, current systems typically operate with high technical circuitry and filter complexity, which increases the energy consumption and the costs.

Similar problems to those in battery systems also occur in energy conversion systems, which comprise, for example, fuel cells or solar modules as the energy conversion elements. In such energy conversion systems as well, a plurality of cells are connected in series to increase the total voltage and connected in parallel to increase the charge or the current flow.

In DE 10 2014 110410 a modular energy store converter system in accordance with the preamble of Claim 1 is disclosed, which offers an advantageous solution to the problems described above. This energy store converter system comprises at least one converter arm, containing a plurality of cascaded standard modules. Each of the above standard module comprises at least one first terminal and at least one second terminal, a storage element for electrical energy, in particular a battery, or an energy conversion element, and a plurality of switches. In each of two adjacent standard modules from the said standard modules, the at least one first terminal of the one standard module is connected either directly or via an intermediate component to the at least one second terminal of the other standard module.

The energy store converter system further comprises a control device that is configured to receive information regarding the current charging state of the storage elements, or regarding the voltage or power of the energy conversion elements, and that is suitable for actuating at least a part of said plurality of switches in an energy supply mode depending on the current charging state of the storage elements or on the current power or voltage of the energy conversion elements, in such a way that the converter arm as a whole supplies a desired voltage or a phase of a desired voltage. In this arrangement the said standard modules are designed and controllable in such a way that the storage element or energy conversion element of a module can be selectively deactivated or decoupled. In this context, the term "deactivation" of a storage element/energy conversion element means that the element concerned is not involved in the energy supply process or a charging process. One way of achieving this is to decouple at least one pole of the storage element/energy conversion element from the rest of the module using a switch.

In this known energy storage converter system, no charge transfer between storage elements is required for supplying energy. Instead, it is possible to interconnect the storage elements or to energy conversion elements in the energy supply mode in such a way that the converter arm as a whole delivers a desired voltage or a phase of a desired voltage itself, so that no other converter is needed, while at the same time avoiding the need to balance the charge between the individual storage elements/energy conversion elements by charge transfer. This is enabled, among other things, by the fact that individual modules can be selectively deactivated, for example because they do not have the charge state currently required, and can be engaged when their current charge, voltage or power state "fits" the desired energy supply.

The energy storage converter system of DE 10 2014 110410 is distinguished from classical battery storage systems with a rigid cell interconnection by a higher efficiency, a flexible scalability, a higher redundancy, a reduced number of system components, a nearly loss-less equalization of the charge state and an inherent failure safety of the overall system in spite of the failure of individual storage elements. These advantages mean that the energy storage converter system of DE 10 2014 110410 is considered to be a particularly promising solution for the electrical drive unit of a vehicle.

However, in addition to the power supply for the propulsion machine, vehicles also require a supply for additional consumers, such as power assisted brakes, lighting, power steering, anti-lock braking system, entertainment systems and air conditioning. In electric vehicles other specific consumers are also present, such as battery cooling, insulation monitor, and the battery management system. A large number of such consumers must be supplied not only during operation of the vehicle, but also when the vehicle is stationary and during the charging process, which applies, for example, to the pre-acclimatization before and the battery cooling after the journey and during the charging process. In addition, systems that are relevant to the safety of the operation of storage systems, such as an insulation monitor in high-voltage systems and the battery management system, continue to run even when the battery is "switched off", i.e. when the high-voltage battery is electrically isolated from the rest of the vehicle, for example in the event of an accident, which can be achieved either automatically or, for example, by emergency personnel who operate a corresponding switch. Such an electrical isolation can also be provided during maintenance work, or when the vehicle is parked without being charged.

A battery management system is usually supplied directly from the cells and can therefore monitor the cells even when the high-voltage store is switched off. Higher-level systems such as the insulation monitoring must, however, be supplied independently of the high-voltage store, in order to remain functional even in the event of a fault or an emergency shutdown of the high-voltage store. For this reason, in electric vehicles with high-voltage stores, a battery-buffered or capacitor-buffered low-voltage network is essential. The term "low-voltage" as used in the field of electric vehicles, in contrast to the terminology normally used in electrical engineering, refers to voltages in the range of around 12 to 48 V.

Most of the above-mentioned consumers have a relatively low power consumption, so that even when the high-voltage system is switched off over a longer period of time they can still be easily supplied from the low-voltage backup battery. However, sometimes systems such as air-conditioning or storage cooling can have a power consumption of, for example, to kW. The power supply for these systems must therefore necessarily be provided directly or indirectly from the high-voltage store, or in the case of a mains connection, from the stationary supply network.

In current electric vehicles the low-voltage network, often designated as the "low-voltage DC bus" (LV-DC bus), is supplied from the main battery store by means of a DC-DC converter. However, in systems with a large voltage difference between the high-voltage network (up to 1000 V and more) and the low-voltage network (typically 12 V), an efficient charge transport is only possible with high technical complexity. In order to reduce conversion and power losses, high-power consumers are usually operated directly at the voltage of the high-voltage electrical network, the so-called HV-DC bus, but in view of the additional high-voltage wiring needed in the vehicle this introduces certain risks.

If the above-mentioned modular energy store converter system is used in electric vehicles, the supply of high-performance consumers turns out to be difficult, because such systems do not have an HV-DC bus, and it is also not possible to implement such an HV-DC bus without considerable effort. The obvious solution in this case is to supply the LV bus via the phase connections for the motor or via the charging infrastructure using an AC-DC converter. The disadvantages in this case are the associated equipment costs and the efficiency losses, which in practice can be difficult to avoid. The reason for the observed efficiency losses are the losses that inevitably occur when rectifying comparatively high voltages, which also have a variable frequency and a fluctuating mean voltage, to a low DC voltage.

SUMMARY OF THE INVENTION

The object of the invention is to extend a modular energy store converter system of the above-mentioned type in such a way that it allows an efficient supply of extra-low voltages without limiting the intended functionality.

This object is achieved by a system according to Claim 1, and by an electric drive for a vehicle according to Claim 31, which makes use of such an energy store converter system. In addition, this object is achieved by a method according to Claim 33. Advantageous embodiments are specified in the dependent claims.

According to the invention, the modular energy store converter system of the above-mentioned type comprises at least one extra-low voltage module (ELV module), wherein
the ELV module has as many first and second terminals as a standard module,
the at least one first terminal of the ELV module is connected to the at least one second terminal of an adjacent standard module and/or the least one second terminal of the ELV module is connected to the at least one first terminal of an adjacent standard module either directly or via an intermediate component, and the ELV module comprises a converter with two inputs and two outputs, wherein the outputs of the converter are connected to associated extra-low voltage cables, in particular LV-DC buses.

In one embodiment the standard modules and the ELV module can be switched such that the inputs of the converter can be alternatively interconnected to the storage element/ energy conversion element of an adjacent standard module serially and/or anti-serially, or
the converter can be decoupled from the storage element/ energy conversion element.

The two alternatives represent two possible switching states, which can be alternatively adopted.

In this case, the "decoupling" of the converter from the storage element/energy conversion element can mean that the converter is bypassed by a by-pass switching state, so that the converter is not located in the active current path, or does not participate in an energy supply process or a charging process. It is important to note that in this variant it is not absolutely necessary for the inputs of the converter to be able to be selectively connected to the storage element/ energy conversion element of an adjacent standard module both in series and in anti-series, but in the preferred embodiments this is actually the case.

Additionally or alternatively, the standard modules and the ELV module can be switched such that the inputs of the converter can either be connected in parallel with the storage element/energy conversion element of an adjacent standard module, or the converter can be decoupled from the storage element/energy conversion element. In this variant, in which the converter either (i.e. in a first switching state) is connected in parallel or (in a second switching state) can be decoupled, it is not absolutely necessary for the option of a serial and an anti-serial interconnection to be provided, however in the preferred embodiments this is the case.

For decoupling extra-low voltages, in accordance with the invention modules of a new type are therefore provided, which are referred to here as ELV modules, and which are integrated into the converter arms in a similar way to the standard modules. The ELV modules can be connected between standard modules in one converter arm or be provided at one of the ends of the converter arm, but are always connected to a standard module directly or Via an intermediate component. Similarly to the standard modules, the ELV module comprises a plurality of switches that allow the inputs of the converter to be either serially or anti-serially connected to or decoupled from the storage element/ energy conversion element of an adjacent standard module, and/or either the inputs of the converter to be connected in parallel with the storage element of an adjacent control module or the converter to be decoupled from the storage element. The outputs of the converter are connected to associated extra-low voltage lines, in particular, LV-DC buses, via which the extra-low voltage can be effectively decoupled from the converter arm.

In this way, the ELV-module can be easily integrated into the converter both structurally as well as from a circuitry and control engineering point of view, wherein the converter—very similarly to a storage element of a standard module—can be treated as an ordinary source or sink in the multi-level converter operation. In this way, for coupling energy into the extra-low voltage network, but also for a possible coupling of energy from the extra-low voltage network into the energy store converter system, all degrees of freedom of the system can be profitably exploited for the interconnection of modules. In particular, at the same time this allows an extra-low voltage network to be provided and an electric motor to be operated with AC multi-phase power.

Although in the following disclosure direct converter applications are primarily described, in particular applications in the field of electric vehicles, the invention is not limited to these. For example, the modular energy store converter system can also be implemented as HVDC systems, which operate using a modular multi-level converter. In this case, the high voltage can have a value of several 100 kV, while the voltage to be decoupled, which is then equivalent to the "extra-low voltage" described herein, is a 230 V alternating voltage, for example. The term "extra-low voltage", in the most general usage of the ELV modules therefore does not refer to an absolute value of the voltage at the outputs of the converter, but to the fact that this voltage is low compared to the voltage which is present across the converter as a whole.

The solution according to the invention has many important advantages. These include an efficient transfer of energy between the energy store converter system and the extra-low voltage network. The coupling of energy into the ELV network can be used with high efficiency in any operating range of the energy store converter system. In addition, the construction costs are comparatively low, since only small voltage differences occur, a small number of components is required, and no or at most a small amount of filtering is needed. In addition, in many cases it is even sufficient if only one ELV module is provided in the entire energy store converter system.

Another advantage is the fact that the decoupling is independent of the maximum voltage of the system, and can be operated in any operating state of the system without the converter system having to be switched at high frequency. In addition, the use of the ELV modules according to the invention offers a high efficiency in the "rest state", due to the constant interconnection of the ELV module with one or more standard modules of the system over a fairly long period of time. An example of such a "rest state" is the case in which an electric vehicle is at a traffic light and therefore no current is currently flowing through the motor. In this case, the inputs of the converter can be connected, for example, in parallel to one or more storage elements in one or more standard modules of the converter system. Another example of the "resting state" is the state in which the energy store converter system is charged by DC current at the external terminals.

Another major advantage is that in preferred embodiments the ELV modules can be used bi-directionally, so that they not only decouple energy from the converter system, but can also feed energy to it. If the energy store converter system is used for battery systems of electric vehicles, the ELV module can be used, for example, for the so-called trickle charge if the vehicle is not being used for a long time, in order to avoid a self-discharge. A simple DC power supply can be used for this, which is connected to the outputs of the converter. It is important to note that in this case, the "outputs of the converter" in accordance with the terminology used in this disclosure represent the inputs with regard to the energy flow. In addition, this allows the battery to be charged using a comparatively low voltage applied at the outputs of the converter of the ELV module. For example, it is easily possible with the system of the invention to recharge the battery system of an electric vehicle, which can deliver a voltage of, for example, 800 V, by means of solar power with a DC voltage of, for example, only 48 V using the ELV module. It is important to note that the system of the invention is a "modular" system, since it has a plurality of cascaded series connected standard modules, each of which comprises either a storage element for electrical energy, such as a battery or a capacitor, or an energy conversion element, such as a solar cell or a fuel cell, which can convert chemical or light energy into electrical energy. It is possible that the same system comprises both storage elements for electrical energy as well as energy conversion elements. In fact, even a single module can contain both a storage element as well as an energy conversion element. In the present disclosure, the embodiments considered are predominantly those in which only storage elements, such as batteries or battery cells, are present. Equally, it is also conceivable that the system only contains energy conversion elements. Since the main applications of the system relate to cases in which at least one storage element for electrical energy is provided, the system is designated as an "energy storage system", which in the terminology of this disclosure is also intended to include the special case wherein the system solely comprises energy conversion elements.

Finally, the system can be embodied as a "direct converter system", which is designed to activate at least some of the said plurality of switches in an energy supply mode depending on the current state of charge of the storage elements or on the current power or voltage of the energy conversion elements, in such way that the converter arm as a whole already supplies a desired voltage or one phase of a desired voltage, so that no other converter is any longer needed. As mentioned above, however, the system can also be implemented as a HVDC converter or the like.

In the operation of the energy store converter system a voltage is preferably present between the outputs of the converter of the ELV module, which is lower than the voltage of the converter arm, in particular a DC voltage with less than 120 V, preferably between to and 48 V, or an alternating voltage of less than 50 V. Where no explicit voltage values are specified, the term "extra-low voltage" in this disclosure is not intended to mean absolute values of the voltage, but to express the idea that this voltage is less, for example smaller by a factor of at least 5, preferably at least to, than the maximum voltage, which is present at the converter arm as a whole.

In an advantageous embodiment each standard module and the ELV module has at least two first terminals and at least two second terminals, wherein for any two adjacent modules the first terminals of the one module are connected directly or via the intermediate component to the second terminals of the other module, and the standard modules and the ELV-module can be switched such that two storage elements/energy conversion elements or one storage element/energy conversion element and the converter in adjacent modules can be connected either in series or in parallel. In this case the said standard modules are designed and can be controlled such that the storage elements or energy conversion elements of two standard modules, which are separated by at least one intermediate standard module with a deactivated storage element/energy conversion element, can be connected either in parallel or in series.

The possibility that storage elements/energy conversion elements can be selectively connected in parallel allows the efficiency of the converter system to be increased substantially. In addition, it is particularly advantageous if a parallel connection between standard modules is also possible, between which a standard module with a deactivated storage element/energy conversion element is located, which greatly increases the flexibility of the circuit and also makes it possible to "skip over" individual storage elements that may be defective, without impairing the functionality of the converter system as a whole.

In preferred embodiments the internal circuitry of the ELV module is designed identically to that of a standard module, except that instead of the energy store/energy conversion element the converter is provided, wherein in the ELV module the inputs of the converter take the place of the poles of the energy store/energy conversion element of the standard module. This facilitates the integration of the ELV module into the converter system in both a structural as well as a functional and control engineering point of view.

In a preferred embodiment, the converter of the ELV module comprises a DC/DC converter, a DC/AC converter or rectifier, or is formed by such a device.

Preferably, the inputs of the converter ELV module are galvanically isolated from the outputs of the same.

The energy store converter system preferably comprises multiple ELV modules, which are provided in different converter arms, wherein preferably at least one ELV module is provided in each converter arm. Although the extra-low voltage can in principle also be decoupled with a single ELV module, the use of multiple ELV modules has proved advantageous for two reasons. One reason is an increased failure safety of the low-voltage supply. The other reason is that using the ELV modules a charge equalization between different converter arms is possible via the low-voltage cable, thus for example, the DC bus, regardless of the topology of the converter. In fact, in certain topologies it is expensive, inefficient or even impossible to accomplish such a charge equalization between the converter arms. This is accomplished in a simple and effective way by the use of at least one ELV module in each converter arm, which are connected by a low-voltage network. Using the ELV modules according to the invention, even a charge exchange between the converter arms of inherently separate converter systems is possible, for example in an electric vehicle, which comprises two motors and two "inherently" (i.e. apart from a coupling via the extra-low voltage cables and the ELV modules) separate converter systems. In this case, the ELV modules that are provided in converter arms of inherently separate converter systems could be connected via the extra-low voltage cables, and therefore allow a charge exchange between the converter systems.

In an advantageous embodiment the energy store converter system comprises a plurality of ELV modules, wherein the outputs of the respective converters of the plurality of ELV modules are connected in parallel with each other. A DC voltage is preferably present at the outputs of the converters of the plurality of ELV modules, and the outputs of the respective converters of the plurality of ELV modules are connected in parallel with a battery. This battery can be, for example, the above-mentioned "backup battery" of the extra-low voltage network or "LV bus".

In an advantageous embodiment the ELV module comprises an energy store, in particular a battery or capacitor, which is connected between the outputs of the converter of the ELV module. This energy store can be used as a buffer store. This is particularly advantageous if there is no actual "backup battery" provided in the low-voltage network or LV bus to smooth out voltage fluctuations of the converter and buffer rapid load changes.

Additionally or alternatively, the ELV module comprises an energy store, in particular a capacitor, which is connected between the inputs of the converter of the ELV module. By means of a capacitor the ELV module can also generate a PWM even if no power is required to be delivered into the low-voltage network. With a capacitor, the voltage on the input side of a DC/DC converter can also be stabilized. If a battery is connected between the inputs of the converter, this can completely replace a "backup battery" in the extra-low voltage network.

In an advantageous embodiment of the energy store converter system, energy can be transferred by the ELV module bi-directionally out of and into the converter arm. In particular, the storage elements of the standard modules of the converter arm can be charged from the outside via the ELV module. In this embodiment the ELV module is thus not only used to decouple extra-low voltages from the converter system, but also to recharge the system from the outside. This is of great practical importance, especially in applications in electrical vehicles.

Preferably, the control device is configured, in a state in which energy is supplied from a converter arm, to connect the inputs of the converter of the ELV module anti-serially to the energy-supplying storage elements in the standard modules of the converter arm. This has the consequence that the output voltage of the converter arm is reduced compared to the series connection of the energy stores of the standard modules of this converter arm by the voltage at the inputs of the converter.

In a similar way, by a rapid switching between the serial or anti-serial mode on the one hand, and the parallel or decoupled mode on the other hand, a PWM can be superimposed on the output voltage of the converter arm, which enables the output voltage to be smoothed, as is explained in greater detail below on the basis of an exemplary embodiment. This offers the additional advantage that the standard modules themselves do not need to be designed to provide a PWM, which significantly reduces the requirements on the switching frequency and the control of the circuitry of the standard modules. In principle, it would also be possible to toggle between the serial and anti-serial mode of the ELV module in order to generate the superimposed PWM, but this is less preferable, because the storage elements of the standard modules would be subject to high loads at high frequency.

Additionally or alternatively, the control device is configured, in a state in which energy is fed into the converter arm, to switch the inputs of the converter of the ELV module in series with the energy-consuming storage elements in the standard modules in the converter arm, and/or in a state in which neither energy is fed into the converter arm nor energy is supplied from the converter arm, to connect the inputs of the converter of the ELV module in anti-series with one or more storage elements in standard modules of the converter arm, and/or in a state in which neither energy is fed into the converter arm nor energy is supplied from the converter arm, to connect the inputs of the converter of the ELV module in parallel with one or more storage elements in standard modules of the converter arm.

Preferably, the control device is configured for actuating at least a part of the said plurality of switches in a charging mode depending on the current state of charge of the storage elements or on the current power output or voltage of the energy conversion elements, in order to charge at least some of the storage elements by means of an AC or DC voltage applied externally to the converter arm. According to this embodiment, no additional charge converter is used, such as is currently required, for example, in electric cars. The system of the invention can in principle be efficiently charged up by means of any desired external voltages. This provides a great advantage, for example when used in electric automobiles, because no additional charge converter need be present on the vehicle, or because no charging stations with such a charge converter are required, which increases the flexibility enormously. Instead, the electric car can be optionally charged, e.g. with three-phase current with an effective voltage of 400 V, or with 230 V AC voltage, depending on what is available.

Preferably, the storage element/energy conversion element of a standard module can be deactivated by setting the position of its associated switches, in which at least one of the poles of the storage element/energy conversion element is not connected to either of the first or second terminals. In principle, many possible means exist for making a storage element/energy conversion element deactivatable, and the invention is not restricted to any specific circuit structure. Systems which have proved advantageous, however, are those in which one of the poles of the storage element/energy conversion element can be decoupled from the rest of the standard module by an associated switch. This allows the desired functionality with a comparatively small number of switches. Preferably, one of the poles of the storage element/energy conversion element can be decoupled from the rest of the standard module by an associated switch.

In advantageous embodiments, the standard modules can be operated in all four quadrants of the current-voltage plane. In particular, the standard modules are preferably designed and can be activated in such a way that the storage elements/energy conversion elements of two adjacent modules can be connected in series with the same polarity, in series with opposite polarity, and in parallel with the same polarity.

In alternative embodiments the standard modules can be operated in two quadrants of the current-voltage plane. To do so, an additional circuit is provided, by means of which a chain of two-quadrant modules connected in series can be polarity-reversed as a single unit. The said four-quadrant modules can also be formed at least partly by a polarity-reversible chain of at least two two-quadrant modules. An ELV module can then be inserted in the chain of the 2-quadrant modules and structured in a similar way to a 2-quadrant module, or else provided as a 4-quadrant module outside the chain. Specific examples are disclosed and described in detail in the above-mentioned DE 10 2014 110 410 A1 and are hereby incorporated by reference into the present disclosure.

In advantageous embodiments, the at least two external terminals in the first and/or last module of the converter arm are connected to each other.

The energy store converter system preferably contains two, three, four, five or more converter arms.

In an advantageous embodiment the at least two external terminals in the first and/or last module of a converter arm are separately connected to at least two external terminals of a module of an adjoining converter arm. In this arrangement the "module" can refer both to the standard module as well as the ELV module.

The said two, three, four, five or more converter arms are preferably interconnected in a star topology or in a ring topology. The two, three, four, five or more converter arms are preferably interconnected in a ring topology in such a way that the at least two external terminals of each converter arm are separately connected to the at least two external terminals of the adjoining converter arm. In addition, the control device is configured to activate at least some of the said plurality of switches in such a way that at least two mutually independent ring currents can flow through the ring of converter arms. In this case, for example, the one ring current can be used to equalize an asymmetry of a corresponding multi-phase network. For example, due to an unbalanced load the three currents of a three-phase network are not equal in size in terms of their magnitude. The ring current of the ring topology in this case enables a power transfer among the phases in a manner that allows the currents to appear equal in magnitude from the point of view of the source. The second ring current can be used to equalize the charge states of individual storage/energy conversion elements—even beyond the phases of the converter.

The switches are preferably formed at least predominantly by semiconductor elements, in particular FETs, IGBTs, IGCTs or thyristors.

In preferred embodiments the storage elements are formed by one or more of the following elements:

a capacitor, a battery cell, a redox flow cell.

Preferably, the energy conversion elements are formed by means of solar cells, fuel cells or thermocouples.

The control device is preferably suitable for defining groups of standard modules, the storage elements of which are to be connected in parallel, wherein the control device is designed to activate at least some of the said plurality of switches depending on the current state of charge of the storage elements, in such a way that before the parallel connection of the standard modules of the group the voltages or charging states of the storage modules are aligned, by standard modules or standard module sub-groups that have a lower voltage or lower charge state preferably being charged during a charging operation, and/or standard modules or standard module sub-groups that have a high voltage or a high charge state being preferably discharged during an energy supply mode.

In this manner the charging states of the modules can be aligned without charge having to be transferred from one module to another, which would inevitably lead to losses. This enables all storage elements in a system according to the invention to have very similar charging states at all times. This means that the cell with the lowest capacity does not—as is the case in previous battery systems—determine the two overall charge states "full" or "empty"; instead, the total capacity of such a system is used much more effectively.

A further aspect of the invention relates to an electric drive for a vehicle, comprising a modular energy store converter system in accordance with one of the embodiments described above, and to a low-voltage on-board network, which is intended for supplying electrical consumers of the vehicle, wherein the low-voltage on-board network is supplied with energy via at least one ELV module of the energy store converter system.

In a preferred embodiment the modular energy store converter system comprises three converter arms, which in operation each provide one phase of the three-phase supply of an electric motor.

A further aspect of the invention relates to a method for decoupling a voltage from a modular energy store converter system in accordance with one of the above-described embodiments or for charging the storage elements of the standard modules of such a modular energy store converter system, in which the standard modules and the ELV module are switched such that a desired voltage to be decoupled is present at the outputs of the converter, or that at least some of the storage elements of the standard modules are charged by means of a voltage present at the outputs of the converter of the ELV module.

A voltage is preferably present between the outputs of the converter of the ELV module, which is lower than the voltage of the converter arm, in particular a DC voltage with less than 120 V, preferably between 10 and 48 V, or an alternating voltage of less than 50 V.

Each standard module and the ELV module preferably comprises at least two first terminals and at least two second terminals, wherein in each two adjacent modules the first terminals of the one module are connected either directly or via the said intermediate component to the second terminals of the other module, and the standard modules and the ELV module in one switching state are connected such that two storage elements/energy conversion elements or one storage element/energy conversion element and the converter in adjacent modules are connected in series, and the standard modules and the ELV module in another switching state are connected such that two storage elements/energy conversion elements or one storage element/energy conversion element and the converter in adjacent modules are connected in parallel.

In this case, the said standard modules are preferably controlled such that the storage elements or energy conversion elements of two standard modules, which are separated by at least one intermediate standard module with a deactivated storage element/energy conversion element, are connected in parallel.

In an advantageous embodiment of the method a plurality of ELV modules is provided in different converter arms, wherein the ELV modules are switched in such a way that a charge equalization is effected between the different converter arms via the extra-low voltage cables, in particular between the converter arms of inherently separate converter systems.

In a first operating state energy is preferably directed out of the converter arm by the ELV module, and in a second operating state energy is transferred into the converter arm by the ELV module, in particular to charge the energy stores of the standard modules of the converter arm externally via the ELV module, in particular with a DC voltage, which is provided by a photovoltaic system and is applied to the outputs of the converter.

In a further advantageous embodiment of the method, in a state in which energy is supplied from a converter arm, the inputs of the converter of the ELV module are connected anti-serially to the energy-supplying storage elements in the standard modules of the converter arm, and/or in a state in which energy is fed into the converter arm, the inputs of the converter of the ELV module are connected serially to the energy-consuming storage elements in the standard modules in the converter arm, and/or in a state in which neither energy is fed into the converter arm nor energy is supplied from the converter arm, the inputs of the converter of the ELV module are connected anti-serially to one or more storage elements in standard modules of the converter arm, and/or in a state in which neither energy is fed into the converter arm nor energy is supplied from the converter arm, the inputs of the converter of the ELV module are connected in parallel with one or more storage elements in standard modules of the converter arm, and/or a PWM is superimposed on the output voltage of the converter arm by switching between the serial or anti-serial mode of the ELV module on the one hand, and the parallel or decoupled mode of the ELV module on the other hand, wherein the switches of the ELV module are preferably switched at a higher switching frequency than the switches of the standard modules.

In a charging mode, at least some of the storage elements are preferably charged by an AC or DC voltage applied externally to the converter arm.

Preferably two, three, four, five or more converter arms are interconnected in a ring topology in such a way that the at least two external terminals of each converter arm are separately connected to the at least two external terminals of the adjoining converter arm, wherein standard modules are connected such that at least two mutually independent ring currents flow through the ring of converter arms.

The modular energy store converter system is preferably used in a drive for an electric vehicle, in which a low-voltage on-board network is supplied with energy via at least one ELV module of the energy store converter system, wherein the low-voltage on-board network is used for supplying consumers of the vehicle.

In an advantageous extension, the energy stores of the modular energy store converter system are charged via the on-board network and the at least one ELV module.

DESCRIPTION OF THE PREFERRED EMBODIMENTS

Figure 1:
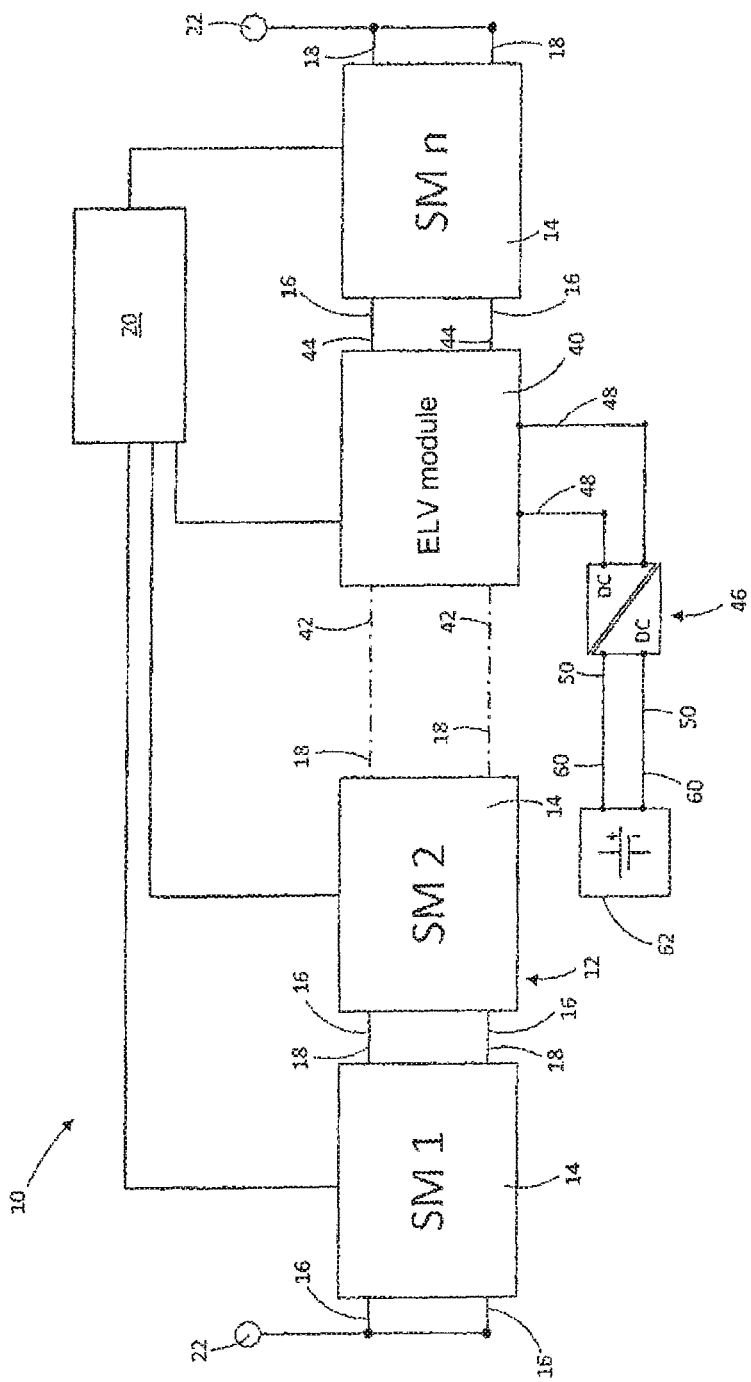
FIG. 1 is a schematic representation of an energy store converter system according to one embodiment of the invention having a single converter arm.

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

FIG. 1 shows an exemplary embodiment of a modular energy store converter system to according to one embodiment of the invention. The system to comprises a converter arm 12, which comprises a plurality of standard modules (SM) 14 connected in series. Although this is not shown in FIG. 1, it goes without saying that the number of standard modules 14 in a converter arm 12 in practical applications can easily number over 100, in some applications over 1000, and even several 1000s. Each of the SMs 14 has two first terminals 16 and two second terminals 18. In each of two adjacent SM 14, the first terminals 16 of one SM are directly connected to the second terminals 18 of the adjacent SM. Instead of a direct connection however, as shown in FIG. 1, connections of adjacent modules can also be indirectly connected via an intermediate component.

Each of the SM 14 contains a storage element for electrical energy, in particular a battery, or an energy conversion element (not shown in FIG. 1), and a plurality of switches (not shown in FIG. 1). The term battery can again be understood as meaning a single cell or a parallel and/or series connection of cells of an accumulator.

In addition, the system to of FIG. 1 comprises a controller 20 which is configured to receive information about the current charging state of the storage elements (not shown) or about the voltage or power of the energy conversion elements (not shown). The controller 20 is also suitable for activating at least some of the said plurality of switches depending on the current state of charge of the storage elements or the current power or voltage of the energy conversion elements in an energy supply mode, in such a way that the converter arm 12 as a whole supplies a desired voltage between its end terminals or external terminals 22. At the end terminals 22 in the exemplary embodiment of FIG. 1, the first terminals 16 of the leftmost module 14 and the second terminals 18 of the rightmost module 14 are grouped together, and the applied voltage is tapped off. The connections shown in FIG. 1 from the controller 20 to the individual modules 14 are to be understood as symbolic. These may involve in each case one or more conductors to the modules 14 or a wireless connection; furthermore, the control device 20 can also be connected via a data bus to one or more modules, so that control information can be forwarded to other modules over the data bus. The control device 20 can also activate the plurality of switches in a charging state, in such a way that energy can be absorbed at the end terminals 22 at a given voltage level.

As shown in detail below on the basis of specific exemplary embodiments, the SM 14 in the preferred embodiments are designed and can be activated in such a way that the storage element or energy conversion element of an SM 14 can be selectively deactivated, and that the storage elements or energy conversion elements of two SM 14, which are separated by at least one intermediate module 14 with a deactivated storage element/energy conversion element, can be selectively connected in parallel and in series.

In this context, the term "deactivation" of a storage element/energy conversion element means that the element concerned is not involved in the energy supply process or a charging process. Due to the facility to "skip over" individual deactivated modules 14 and nevertheless to connect such modules 14, which are separated by deactivated modules, either in parallel or in series, almost any voltage waveforms can be generated as the output at the end terminal 22, and the system to can be charged by almost any voltages applied to the external terminals 22, whether they be DC or AC, and indeed in both cases in such a way as to avoid a lossy charge transfer between the modules 14. It should be noted that in the following description, the terms "parallel connection" or "series connection" of modules are intended to mean that the relevant storage elements for electrical energy, or energy conversion elements, are switchably connected in parallel or in series.

As shown further in FIG. 1, the converter arm 12 contains an ELV module 40. The ELV module 40, exactly like a standard module (SM) 14, has two first terminals 42 and two second terminals 44. The ELV module is integrated into the converter arm 12 in the same way as an SM 14. This means that the first terminals 42 of the ELV module 40 are connected to the second terminals 18 of the one adjacent SM 14, and its second terminals 44 to the first terminals 16 of the other adjacent SM 14.

The ELV module 40 also comprises a converter 46 with two inputs 48 and two outputs 50. In the embodiment shown the converter 46 is a DC-DC converter. As explained in more detail below by reference to exemplary embodiments, the standard modules 14 and the ELV module 40 can be switched such that the inputs 48 of the converter 46 can either be interconnected to the storage element (not shown) of an adjacent SM 14 serially, anti-serially, or decoupled, in particular galvanically isolated, from the storage element. The outputs of the converter 46 are connected to a DC bus 60, which represents an example of the above-mentioned extra-low voltage conductor. Via the DC bus 60 a low-voltage power source 62 is supplied, in the exemplary embodiment shown a battery 62.

Figure 2:
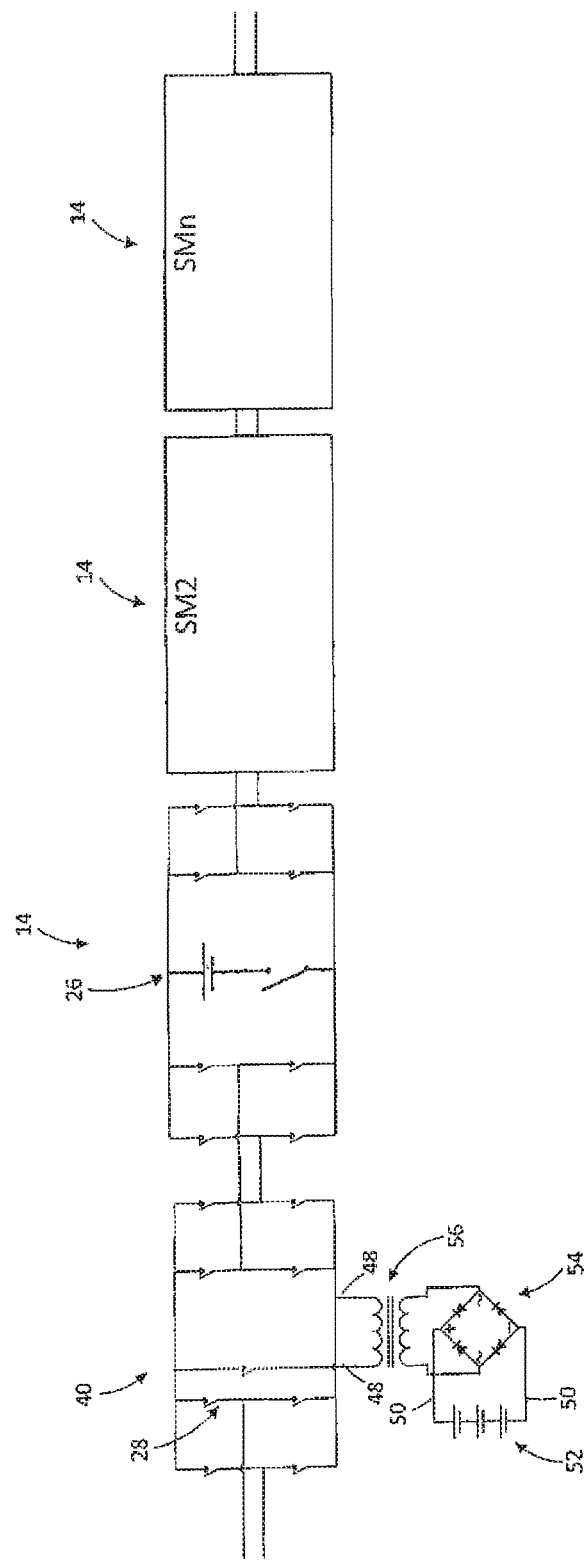
FIG. 2 shows a specific design of the standard modules and the ELV module in a converter arm of an energy store converter system in accordance with an embodiment of the invention.

In FIG. 2 specific embodiments of the SM 14 and of an ELV module are shown in more detail. As is apparent from FIG. 2, each SM 14 contains a storage element 26 for electrical energy, which can be, for example, a rechargeable battery or accumulator. It goes without saying that other storage elements are possible, for example, a capacitor or a Redox flow cell. It also goes without saying that instead of the storage elements 26, energy conversion elements can also be used, for example solar cells, fuel cells or thermocouples, without being explicitly referred to in the following description.

The SM 14 of FIG. 2 comprises nine switches 28, which for the sake of simplicity are represented here by a generic symbol. In some embodiments, the switches 28 can be formed by a MOSFET 30 and a freewheeling diode 32, see FIG. 3. It is, however, understood that other switches can also be applied, in particular IGBTs, IGCTs, or thyristors. It is understood that all of these possibilities can be applied in each embodiment, provided that this is compatible with the circuit topology.

The module 14 of FIG. 2 is operationally connected to a control device (not shown in FIG. 2), which corresponds to the control device 20 of FIG. 1. This control device receives information regarding the current charging state of the storage element 26, or regarding the current output power or voltage if an energy conversion element is present instead of the storage element 26. This control device 20 is also suitable for activating the switches 28 of the module 14 and thus for operating them.

The SM 14 of FIG. 2 is a four-quadrant module, i.e. a module that can be operated in all four quadrants of the current-voltage plane. If two of the SM 14 shown in FIG. 2 are connected in series, then the corresponding storage elements 26 of these adjacent modules can be connected in series with the same polarity,
in series with opposite polarity, and
in parallel with the same polarity.

The storage element 26 can also be deactivated by opening the switch 28, which is adjacent to the lower pole of the storage element 26 in the drawing of FIG. 2.

If a plurality of SM 14 is connected in series as shown in FIG. 2, the storage elements 26 of not only adjacent SM 14, but also of such SM 14 that are separated by one or more deactivated SM 14, can be selectively connected in series or in parallel.

In addition, it is apparent in FIG. 2 that the ELV module 40 has a very similar structure to the SM 14. The only difference is that instead of the storage element 26 provided in a SM 14 and the switch 28 adjacent to the storage element 26 shown directly below in the drawing, the converter 46 is provided, wherein the inputs 48 of the converter 46 take the place of the poles of the energy store 26 of the SM 14. Also in FIG. 2, one of the switches 28 which directly connects to one of the inputs 48 of the converter 46, is drawn with a dashed line to indicate that this switch can also be optionally omitted.

As can also be seen in FIG. 2, the converter 46 also comprises a transformer 56 and a rectifier 54. In this embodiment, the two ends of the primary coil of the transformer 56 thus correspond to the "inputs" 48 of the converter 46, which in this variant is implemented as an AC-DC converter. The term "input" 48 of the converter 46 thus primarily indicates that the associated poles or terminals are provided "on the input side" and is not in contradiction with the fact that in this embodiment a current flows into the one input 48 and out of the other input 48. The use of the transformer 56 implies that the outputs 50 of the converter 46 are galvanically isolated from its inputs 48. As is also apparent from FIG. 2, the ELV module 40 comprises an energy store 52, in particular a battery or capacitor, which is connected between the outputs 50 of the converter 46 of the ELV module 40.

It is important to note that a number of modifications to the ELV module 40 of FIG. 2 are possible. For example, it is possible to omit the rectifier 54 and instead to decouple an AC voltage directly at the outputs 50 of the converter 46.

As mentioned above, the ELV module 40 of FIG. 2 offers all the above-mentioned possibilities with regard to the parallel circuit, series circuit, anti-series circuit and decoupling or deactivation. For many embodiments of the invention, however, simplified ELV modules 40, such as are shown in FIG. 2A to 2C, are also a possibility.

Figure 2A:
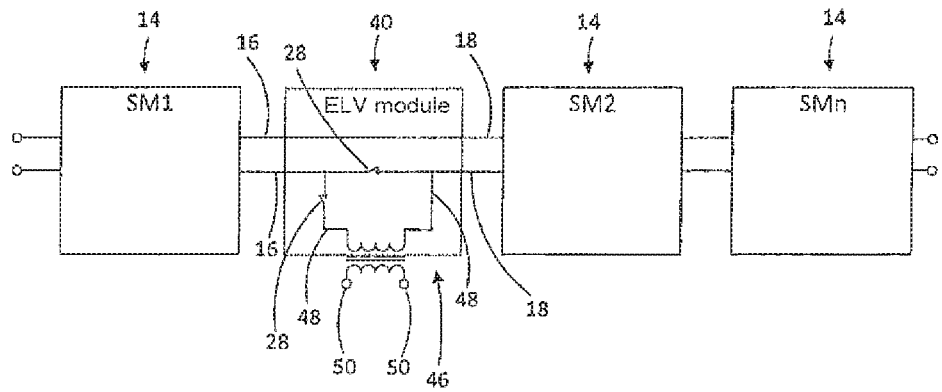
FIG. 2A shows a simplified ELV module for decoupling an alternating voltage, comprising two first and two second terminals.

FIG. 2A shows an ELV module 40 in which the converter 46 is formed by a transformer arrangement, in which the inputs 48 of the converter 46 are connected to a primary coil and the outputs 50 of the converter 46 are connected to a secondary coil. By alternating opening and closing of the two switches 28, in a first switching state of the inputs 48 of the converter 46, i.e., the ends of the primary coil, are serially connected to the energy stores of the adjacent standard modules 14, so that a current flows through the primary coil, and in a second switching state the primary coil is decoupled from the energy store of the left standard module 14 in FIG. 2A, so that no current flows through the primary coil. By a rapid changeover between these two switching states, an alternating current is generated in the primary coil, which can be decoupled via the secondary coil.

Note that in FIG. 2A one switch 28 is drawn with a dashed line to indicate that this switch can also be omitted in certain embodiments. If, in fact, the primary coil is short-circuited by closing the other switch 28, practically no current flows through the primary coil anyway, so that even without the additional open switch it can be effectively considered to be "decoupled" or "deactivated".

Figure 2B:
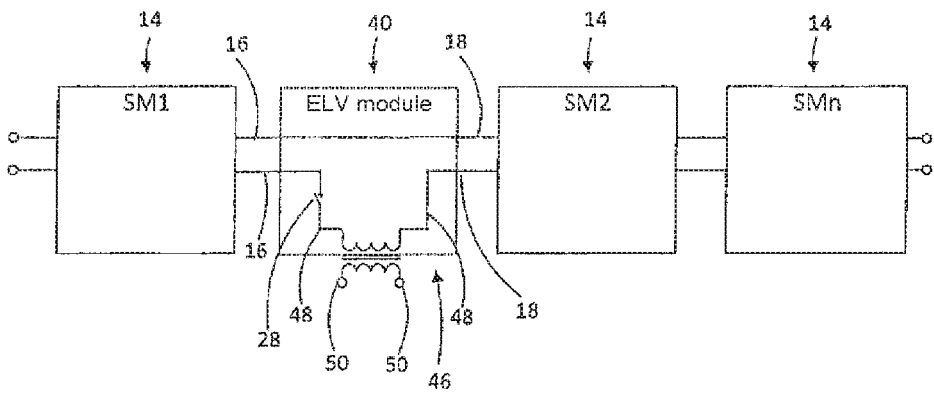
FIG. 2B shows a further simplified ELV module for decoupling an alternating voltage, comprising two first and two second terminals.
Figure 2C:
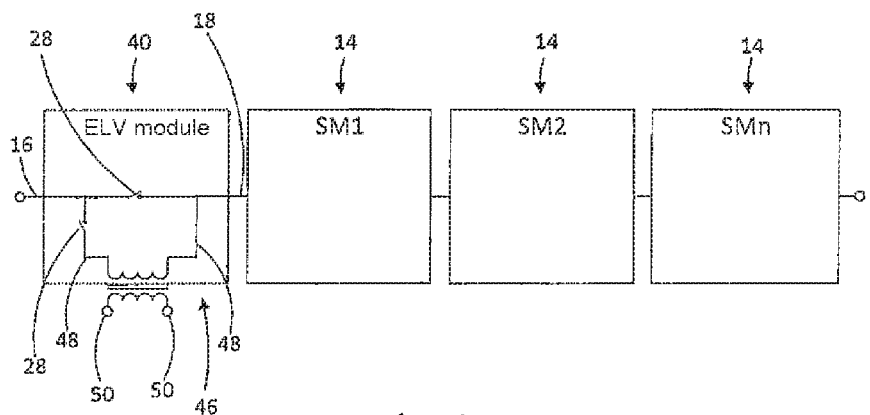
FIG. 2C shows another simplified ELV module for decoupling an alternating voltage, similar to that of FIG. 2A, but only comprising one first and one second terminal.

FIG. 2B shows an even simpler embodiment with only one switch 28, through the activation of which an alternating current can be generated in the primary coil. As a variant of the embodiment of FIG. 2A, it is possible for the primary coil to not be short-circuited and not directly bypassed. This may be acceptable depending on the design of the standard modules 14, because the ELV module 40 has two first and two second terminals 42, 44, so that a current flow through the ELV module 40 is also possible outside of the primary coil, as can be seen from FIG. 2B.

FIG. 2C shows an embodiment similar to that of FIG. 2A, but which relates to ELV modules 40 with only one first and one second terminal 42, 44.

Figure 3:
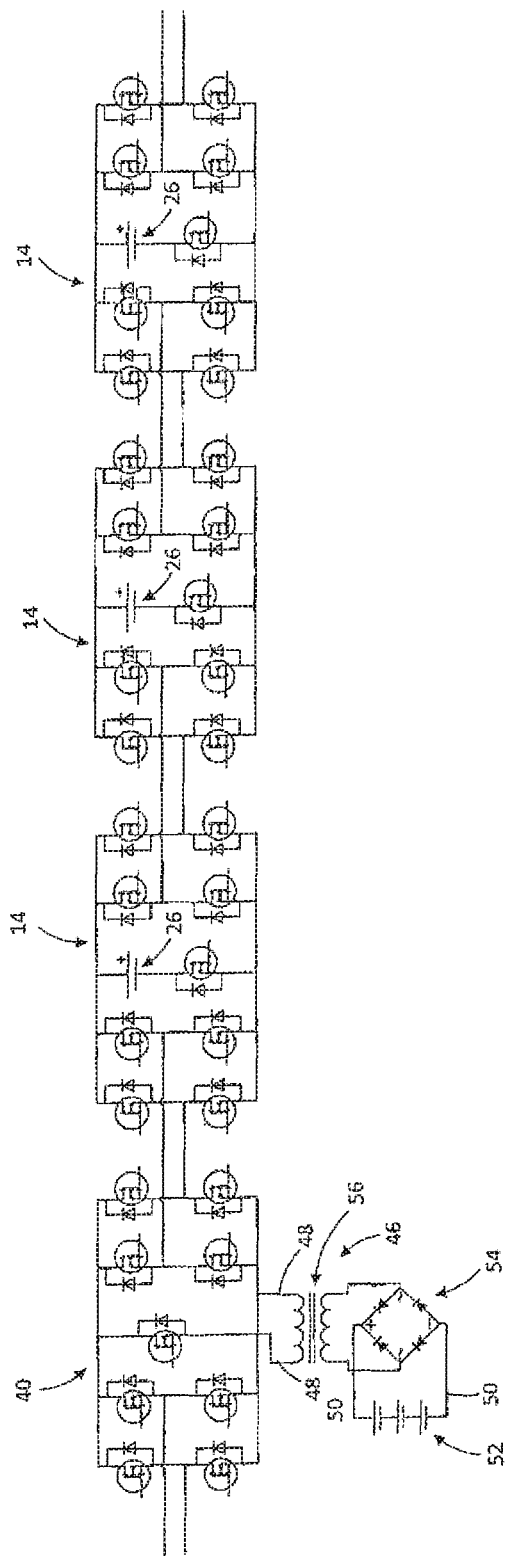
FIG. 3 shows a further specific design of the standard modules and the ELV module in a converter arm of an energy store converter system in accordance with an embodiment of the invention.

FIG. 3 shows a variation of the design of FIG. 2, in which the ELV module 40 comprises the same "ninth" switch 28, such as the SM 14, so that the ELV-PWM module 40 is even more similar to the SM 14. In fact, the only variation here is that the energy store 26 of the SM 14 is replaced by the primary winding of the transformer 56.

Figure 4:
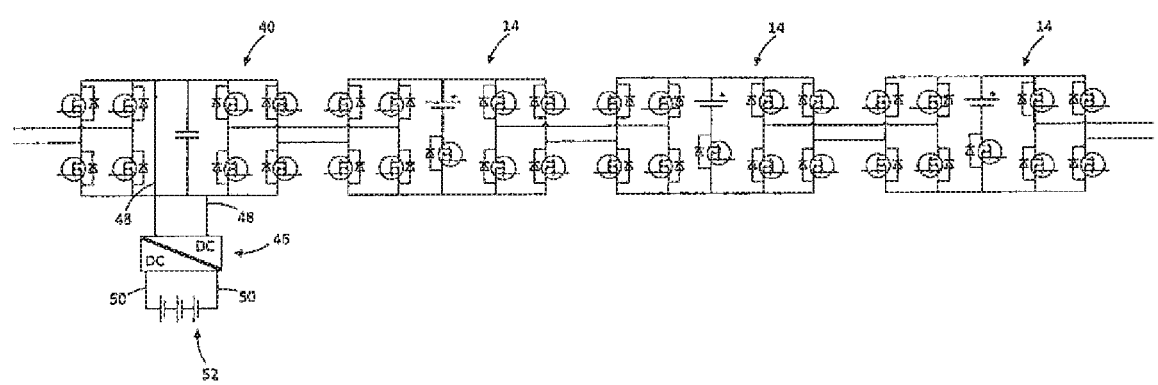
FIG. 4 shows a further specific design of the standard modules and the ELV module in a converter arm of an energy store converter system in accordance with an embodiment of the invention.

FIG. 4 shows yet another variation of the structure of FIG. 2 or FIG. 3: in the representation of FIG. 4, the converter 46 is formed by a DC-DC converter. In this variant, ELV module 40 comprises an energy store 58, in the exemplary embodiment shown a capacitor, which is connected between the inputs 48 of the converter 46. In other words, the input voltage of the DC-DC converter 46 is the same voltage as is applied across the energy store 58 of the ELV module 40. It is important to note that the ELV module 40 of FIG. 4 contains all the components of the standard module 14 of FIG. 4, so that in this case the ELV module 40 can be considered a special case of a standard module. This means that by way of variation from the representation of FIG. 4, the entire system to could be built exclusively from such ELV modules 40. The present disclosure therefore does not exclude the possibility that the said standard modules and ELV modules are structurally identical, provided that they fulfil the requirements defined herein.

Figure 5:
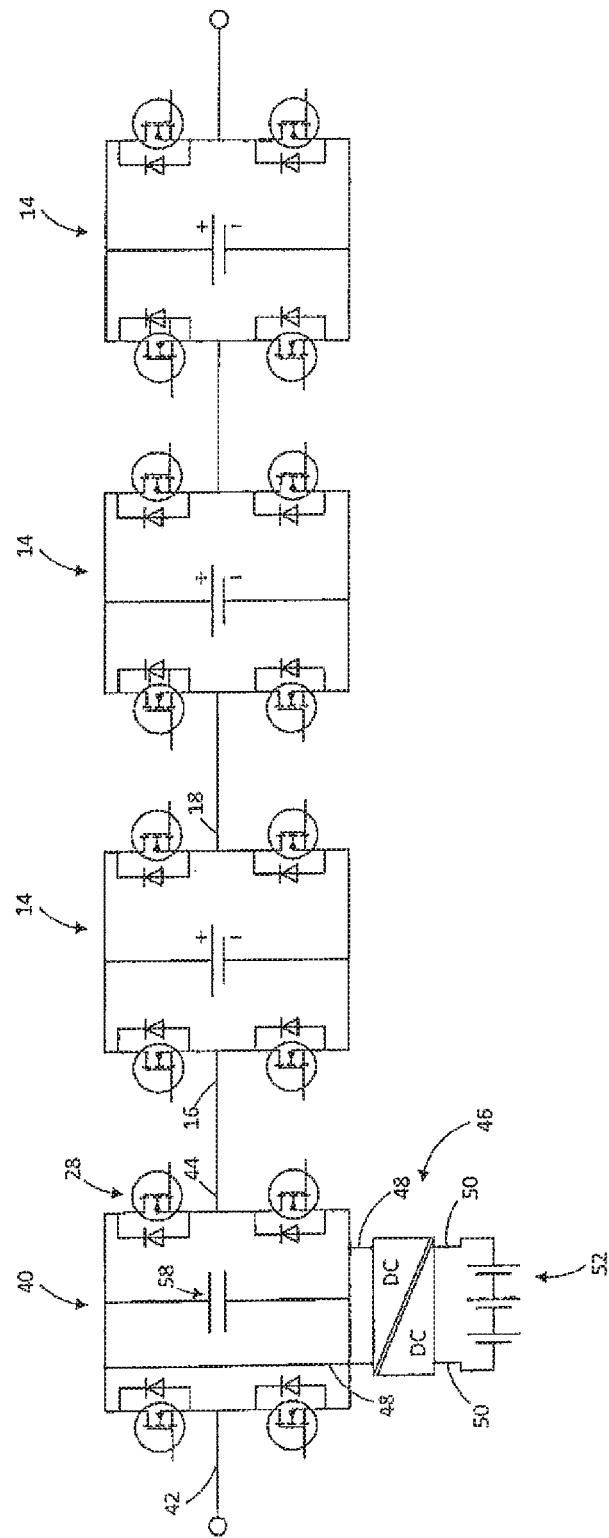
FIG. 5 shows a further specific design of the standard modules and the ELV module in a converter arm of an energy store converter system in accordance with an embodiment of the invention, in which each module comprises only one first and one second terminal.

FIG. 5 shows a further embodiment of a converter arm 12 with three SM 14 and one ELV module 40. In the embodiment of FIG. 5, the modules 14, 40 are simpler in design and, in particular, have only one first terminal 16 or 42 and one second terminal 18 or 44. It is apparent once again, however, that the ELV module 40 is basically designed in the same way as the SM 14, with the only difference being that instead of the energy store 26, an energy store 58 is provided at which a voltage is present that forms the input voltage of the DC-DC converter 46.

The SM 14 are of the type as described in the patent DE 10103031 by R. Marquardt, "Converter Circuits with Distributed Energy Stores". These SM 14 do not allow the energy stores to be selectively connected in parallel, instead only a desired number of SM 14 can be connected in series, and the remaining number of SM 14 can be disabled, in order to obtain a desired voltage on the converter arm 12 as a whole. Although the functionality of these SM 14 are limited compared with the above-described SM 14 with two first and two second terminals 16, 18, due to their simplicity and the fact that they can be implemented with relatively few switches 28, they can be important in practical applications.

Figure 6:
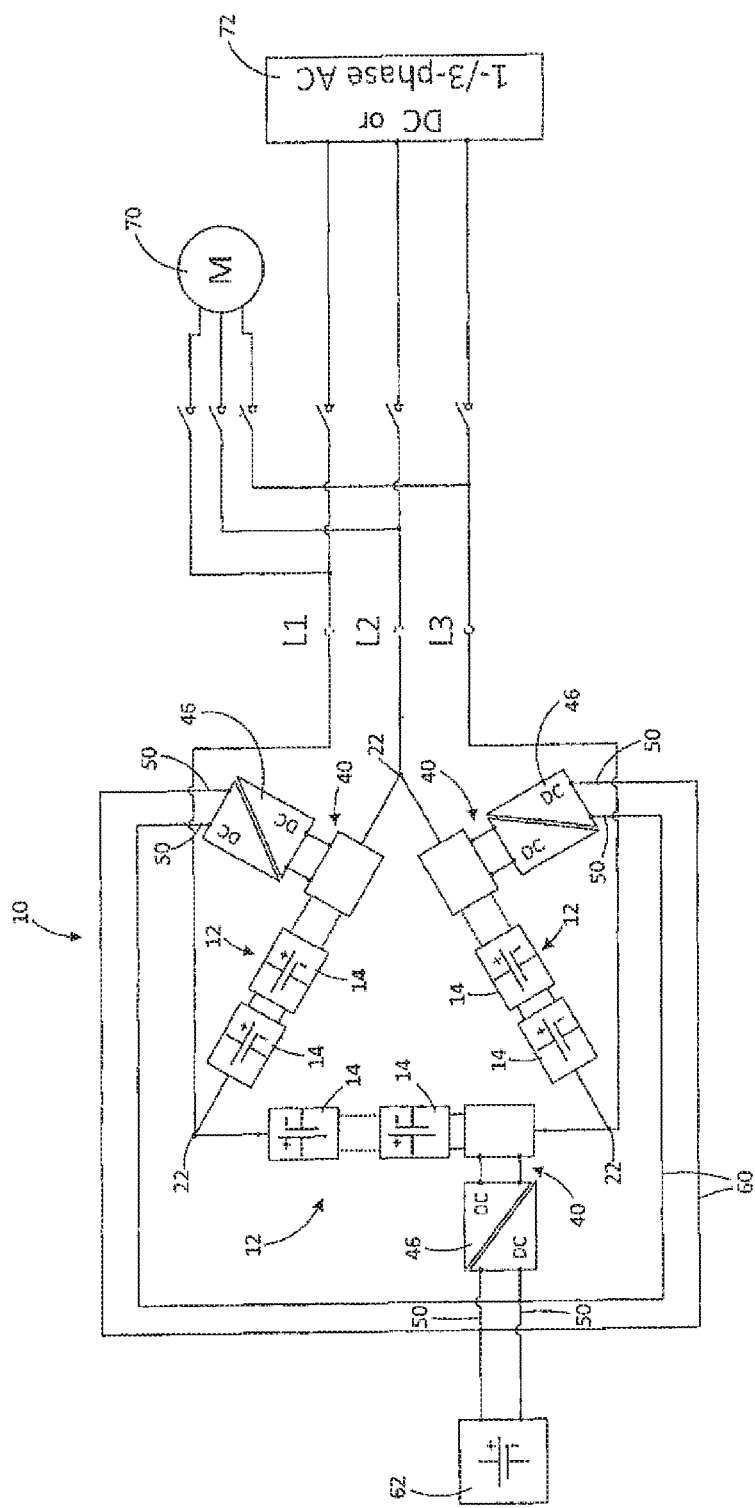
FIG. 6 shows an electric drive for a vehicle according to one embodiment of the invention.

FIG. 6 shows an embodiment of an electric drive for a vehicle. This drive comprises a modular energy store converter system 10 with three converter arms 12. Each converter arm 12 contains a plurality of SM 14, and an ELV module 40 with the associated DC-DC converter 46. The outputs 50 of all the DC-DC converters are connected via a DC bus 60 in parallel with a battery 62, via which all the consumers in the vehicle, which are not part of the drive unit, can be supplied with power. As can also be seen in FIG. 6, the two outer terminals in the first and last module 14, 40 of each converter arm 12 are connected to each other. The three converter arms 12 form a triangle topology, wherein at the corners of the triangle thus formed the three phases of a three-phase current are generated, with which a motor 70 can be driven. In addition, a charging terminal 72 is provided, via which the energy store converter system 10 can be recharged. It is in the nature of the energy store converter system 10 that this charging can be carried out without an additional charge converter. Instead, the energy store converter system 10 can in principle be charged by any direct current or alternating current. Relevant in practice is a charging process with a single-phase or three-phase alternating current, or with direct current.

As is apparent from FIG. 6, in this embodiment each converter arm 12 contains a separate ELV module 40, although in principle one such module 40 might be sufficient to supply the battery 62 with extra-low voltage or low voltage, typically between 10 and 20 V. The use of a separate ELV module 40 in each converter arm 12 increases the failure reliability of the low voltage power supply, however. In addition, the ELV modules 40 can be used to achieve a charge equalization between different converter arms 12 via the DC bus 60.

Figure 7:
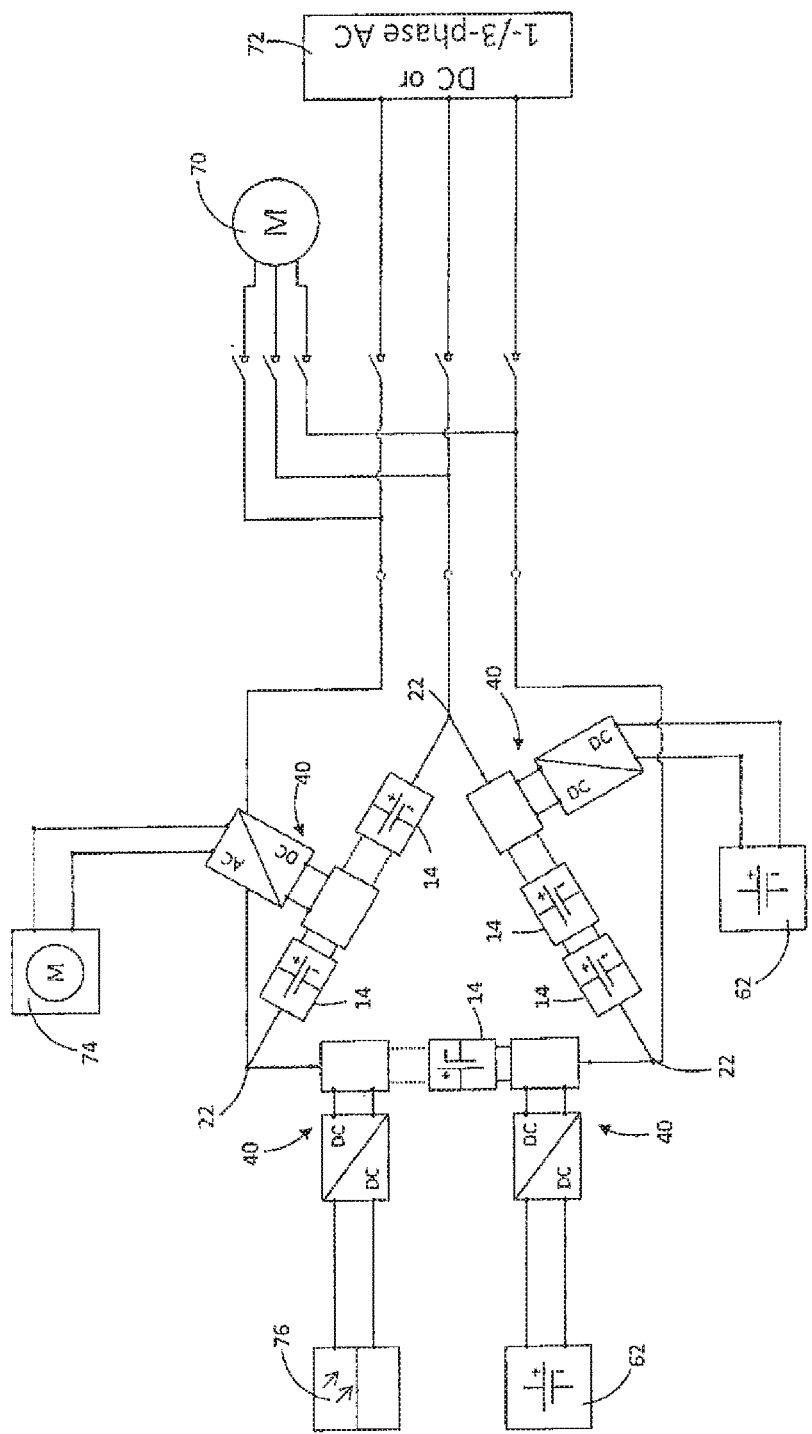
FIG. 7 shows an electric drive for a vehicle according to a further embodiment of the invention.

FIG. 7 shows a very similar structure to that of FIG. 6. The only difference is that in the embodiment of FIG. 7 the outputs 50 of the converters 46 of the ELV modules 40 are not connected to a common DC bus but are connected to different systems instead. These systems can be consumers, for example a motor 74, but they can also be solar cells 76, generators or fuel cells, through which energy is fed into the energy store converter system to. This is readily possible because the ELV modules shown allow a bidirectional transfer of energy into and out of the energy store converter system 10.

Figure 8:
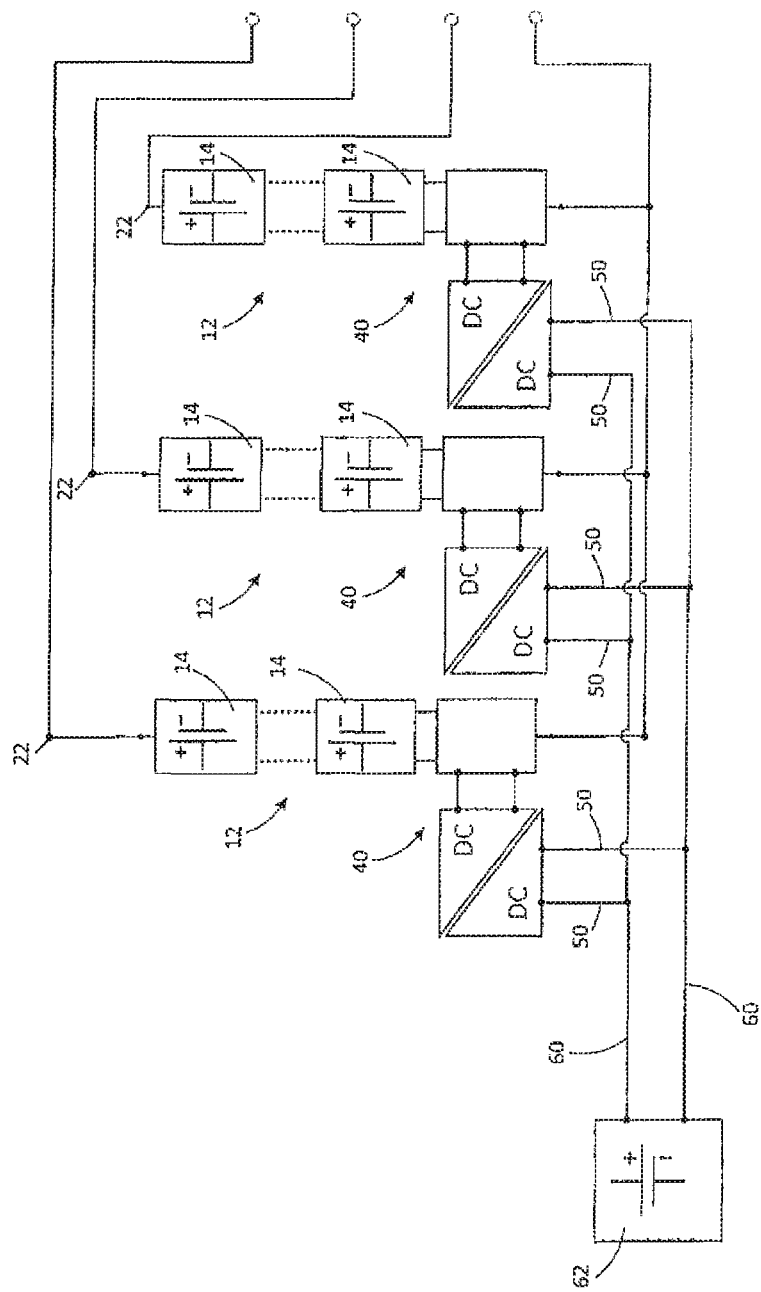
FIG. 8 shows the structure of a modular energy store converter system according to one embodiment of the invention.

FIG. 8 shows a further embodiment, which also contains three converter arms 12, in each of which an ELV module 40 is provided, which contains a DC-DC converter 46. As in the embodiment of FIG. 6, in the embodiment of FIG. 8 the outputs 50 the converter 46 are also connected in parallel with a battery 62 via a DC bus 60. However, the topology of the converter arms 12 differs from the triangular topology of FIG. 6: in FIG. 8 the one ends of each converter arm 12 are connected to each other and are at ground potential. At the respective other ends of the converter arms 12 the three phases of a three-phase current are applied. Although the converter arms 12 in FIG. 8 are shown in parallel, this corresponds to a star topology.

Figure 9:
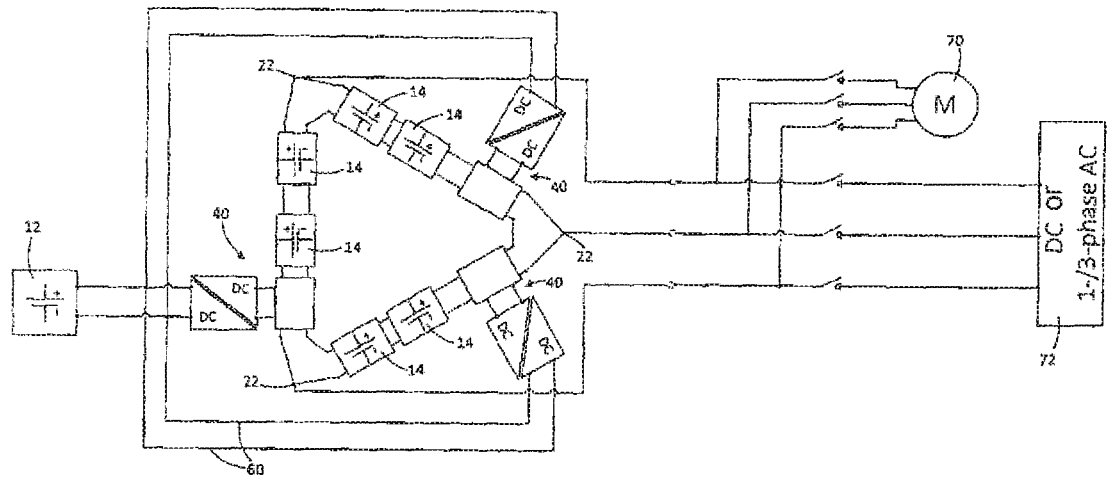
FIG. 9 shows an electric drive for a vehicle according to a further embodiment of the invention.

FIG. 9 shows a further embodiment, similar to that of FIG. 6. In the exemplary embodiment shown, by way of deviation from the variant of FIG. 6 the terminals of the modules 14 and 40, which are located at the respective ends of the converter arms 12, are not merged. The advantage of this topology is that two controlled and mutually independent ring currents can be conducted, wherein the one ring current can be used, for example, for equalizing an asymmetry of the corresponding multi-phase network, while the second ring current can be used for equalizing the charge states of individual energy conversion or storage elements—even beyond the phases of the system 10. For the energy store converter system to shown in FIG. 9 it is also the case here that charging or discharging with AC or DC power can take place via just two of the three tapping points 22. In addition, here also the topology can be extended to any number of phases.

Figure 10:
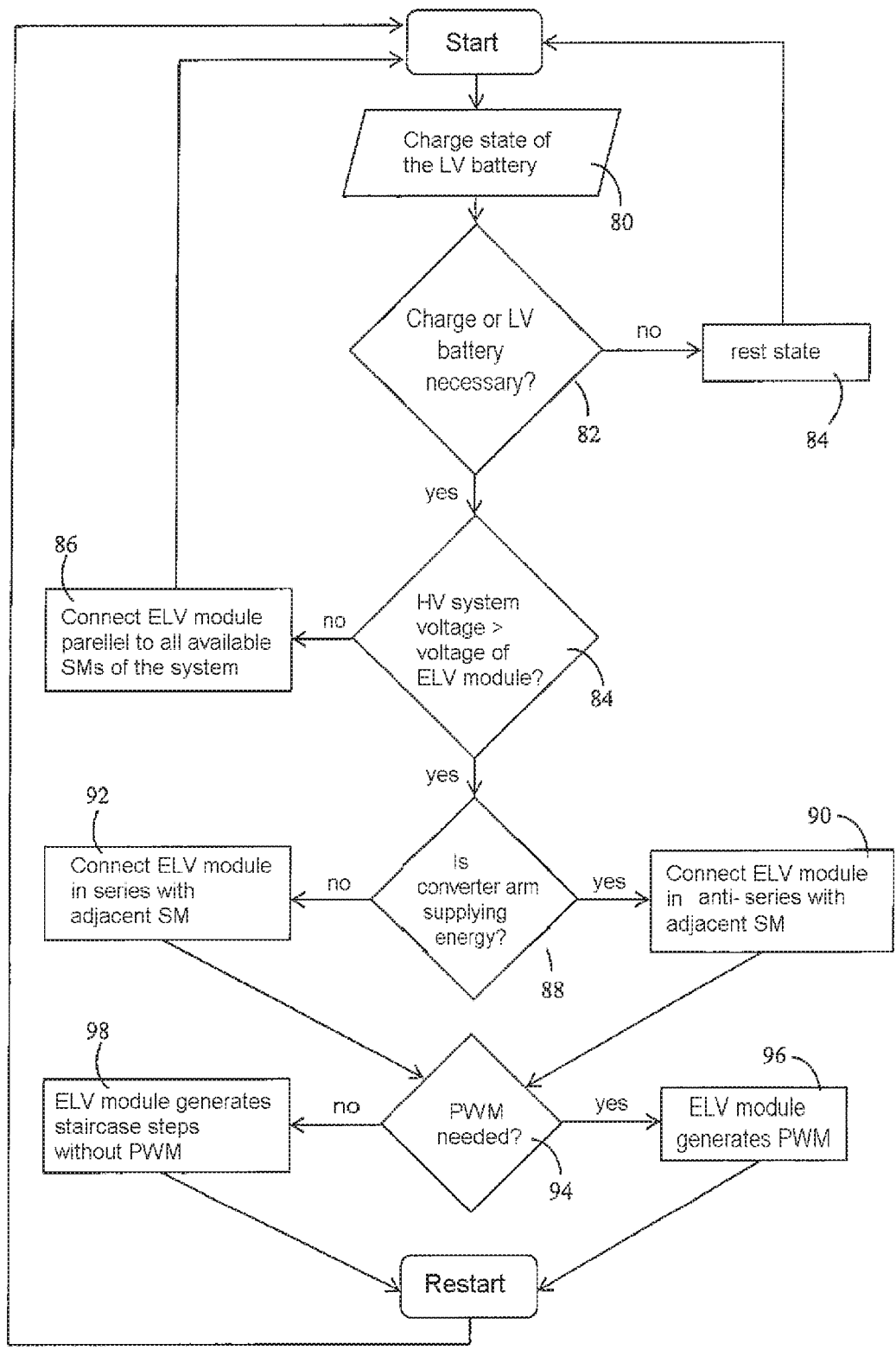
FIG. 10 shows a flow chart which illustrates the operation of an energy store converter system according to an embodiment of the invention.

FIG. 10 shows a flow chart that illustrates the operation of the energy store converter system to according to an embodiment of the invention. In Step 80 the state of charge of the low-voltage battery 62 is checked. In step 82 it is checked whether the low voltage battery 62 needs to be charged. If this is not the case, this means that the ELV modules 40 can occupy a resting state (step 84), and the process returns to the start.

If in step 82 it is determined that the LV battery 62 needs to be charged, then in the following step 84 it is checked whether the HV system voltage is greater than the voltage of the ELV module 40. In this case the HV system voltage is the voltage that is present at the end terminals 22 of a converter arm 12. If this is found not to be the case, the process proceeds to step 86 where the ELV module 40 is connected in parallel with all available standard modules 14 of the system 10. Otherwise, the process proceeds to step 88, where a check is performed as to whether the converter arm 12 is supplying energy. If this is the case, in step 90 the ELV module is connected anti-serially to adjacent SMs 14. Otherwise, in step 92 the ELV module is connected in series with adjacent SMs 14.

Thereafter, in step 94 it is determined whether a pulse width modulation is necessary. If this is the case, the ELV module 40 carries out the PWM in step 96. Otherwise, in step 98 the ELV module 40 generates steps of a staircase waveform without PWM. At this point the process returns to the start and begins afresh.

Figure 11:
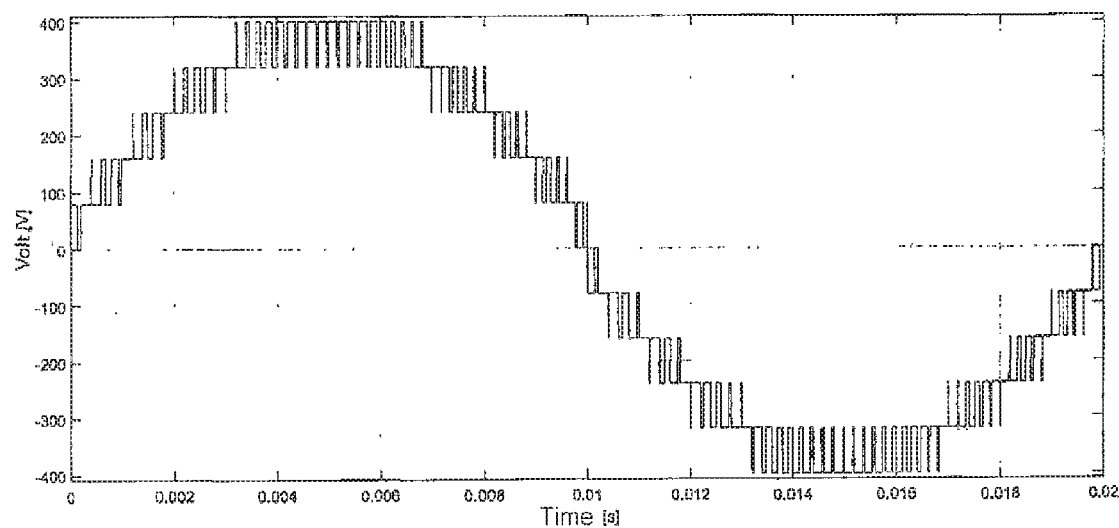
FIG. 11 shows the temporal waveform of an exemplary output voltage of a converter arm, on which a PWM is superimposed by means of an ELV module.

FIG. 11 shows the temporal waveform of an exemplary output voltage of the converter arm, on which the PWM is superimposed by the ELV module 40. The output voltage shows the typical staircase form, which occurs when a discrete number of energy stores in the standard modules 14 are connected selectively in series. These steps are superimposed with a PWM signal as shown in FIG. 11, that is generated by connecting the ELV module 40 (or more precisely the inputs 48 of the converter 46 of the same) by pulse-width modulation alternately in series (or anti-series) and parallel to the energy stores 26 in adjacent standard modules 14. This results overall in a smooth sinusoidal waveform. Instead of switching between serial/anti-serial and parallel it is also possible to switch between serial/anti-serial and the decoupled mode, which decoupled mode, in the same way as the parallel mode, does not affect the output voltage of the converter arm 12.

In principle, it would be conceivable for the standard modules 14 themselves to be configured for PWM, so that they are clocked on and off at high frequency, thus approximating the total time-averaged voltage to a perfect sine wave. This has the disadvantage, however, that in this case, all standard modules 14 would have to be addressable at the PWM frequency, which would typically be at least 20 kHz. This leads to high loading on the control system, especially in systems with a large number of modules. In battery-based systems this is compounded by the fact that the resulting high-frequency charging-discharging current is detrimental to the lifetime of the batteries. In this respect, it is particularly advantageous if the PWM is carried out by the ELV module 40, as shown in FIG. 11.

Four-Quadrant Modules Having Two First and Two Second Terminals

In addition to the standard modules 14 shown specifically in FIGS. 2 to 5, a great many other variants are also possible, of which some advantageous ones are discussed briefly in the following.

FIG. 12-16 show examples of four-quadrant modules each having two first and two second terminals 16, 18.

Figure 12:
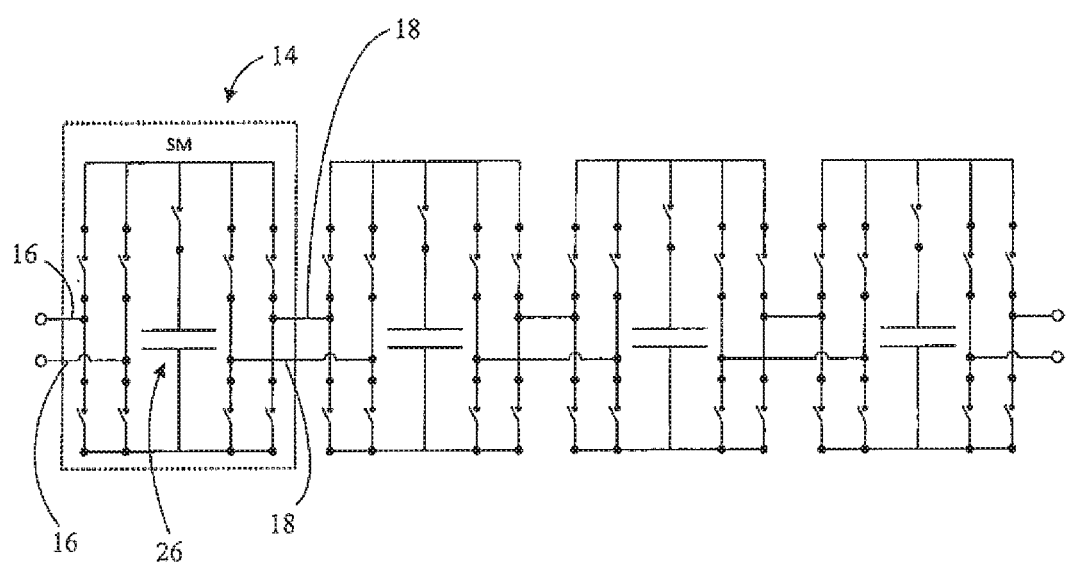
FIG. 12-16 show four-quadrant modules having two first and two second terminals.

FIG. 12 shows the cascaded series connection of a plurality of standard modules 14, in which the combination of MOSFET 30 and free-wheeling diode 32 has been replaced by a simple switch symbol. Also, in the series circuit a single standard module 14 has been identified by a box drawn with dashed lines.

Figure 13:
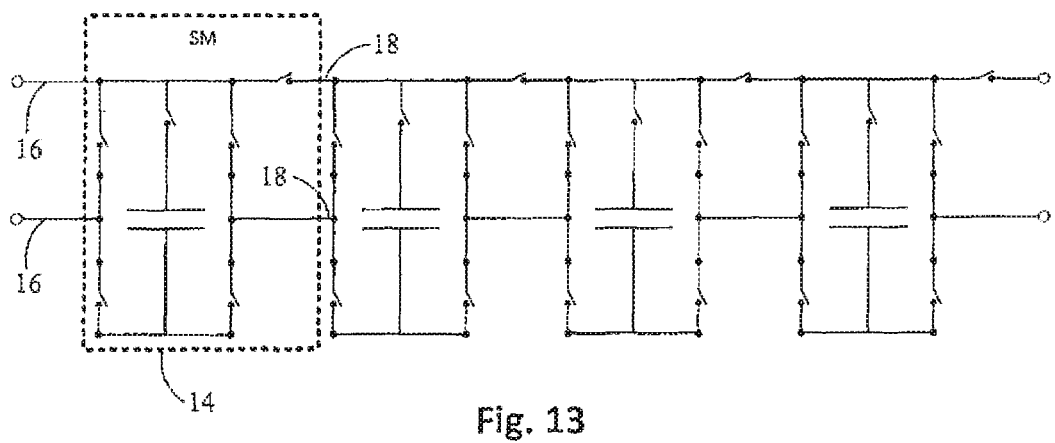

FIG. 13 shows a series connection of standard modules 14 of a different type having only six switches 28 per module 14, wherein a single SM 14 is again identified by a box drawn with dashed lines. In this and the following figures, the reference numerals for the switches 28 and the storage elements are omitted, because they are not required for understanding.

It is important to note that the term "module", both in terms of the standard module 14 and the ELV module 40 in the present disclosure is to be understood broadly. In some embodiments the modules 14, 40 are expediently separate assemblies, which can be combined with each other and individually replaced. In other embodiments the modules 14, 40 merely consist of functional units within a circuit, without the modules 14, 40 being in any way physically separated.

The SM 14 of FIG. 13 also contains a switch, via which one pole of the storage element can be disconnected from the rest of the module in order thereby to deactivate the storage element.

Figure 14:
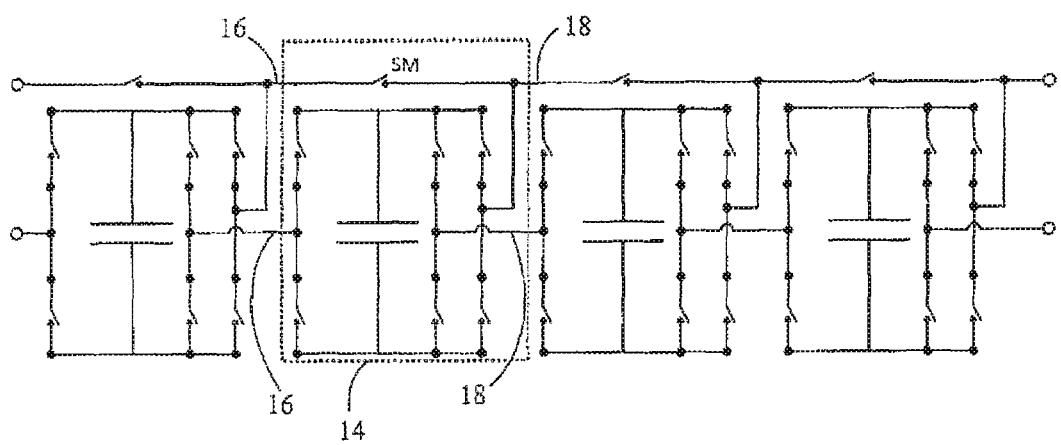
Figure 15:
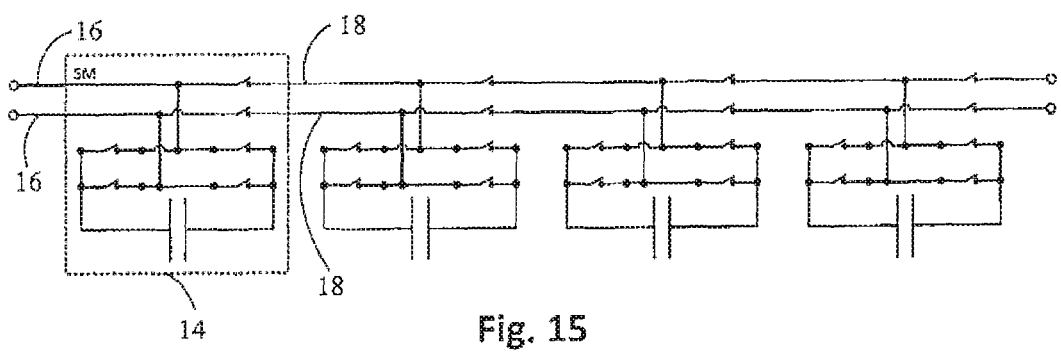

FIGS. 14 and 15 show two other four-quadrant modules 14 having two first and two second terminals 16, 18, having seven and six switches per module 14 respectively. In the modules 14 of FIGS. 14 and 15 the storage element 26 can also be deactivated, however, for this purpose, no switch which directly adjoins a pole of the storage element 26 is provided.

Figure 16:
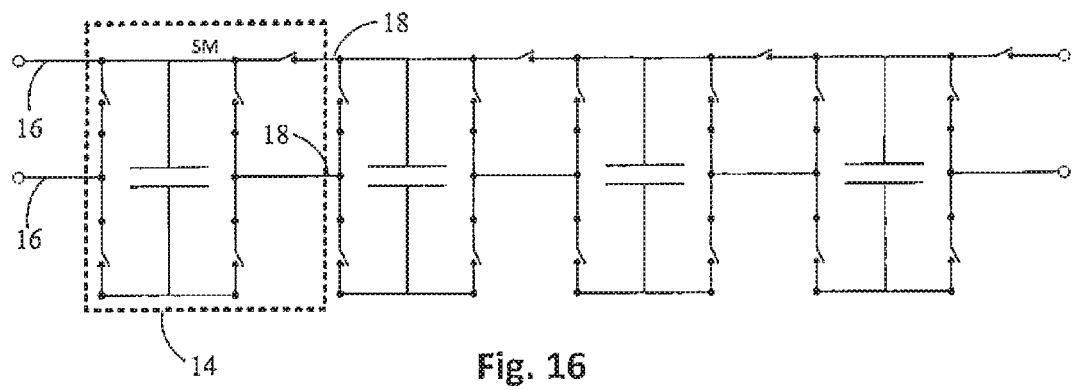

Finally, FIG. 16 shows an embodiment having only five switches per standard module 14. In the embodiment shown in FIG. 16 however, the standard modules 14 do not allow the parallel connection of two standard modules 14 that are separated by one or more deactivated standard modules 14. FIG. 16 however indicates the option by which the storage elements may be deactivated in a different manner. If, for example, the storage element is a redox flow cell, this can be deactivated by shutting off the pump. In this way the storage element could therefore be deactivated by being activated by the control unit (not shown), but not by switching one of the switches as shown explicitly herein.

Four-Quadrant Modules Having Three First and Three Second Terminals

Figure 17:
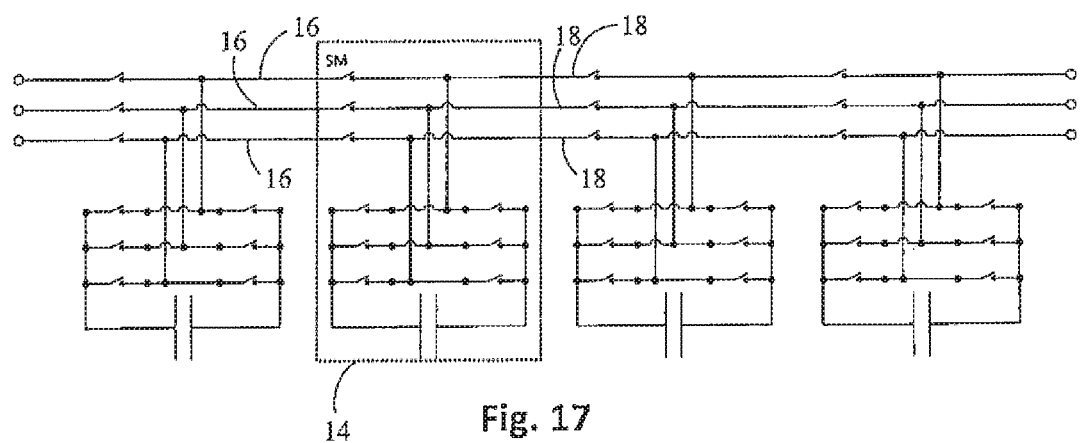
FIG. 17-22 show four-quadrant modules having three first and three second terminals.
Figure 18:
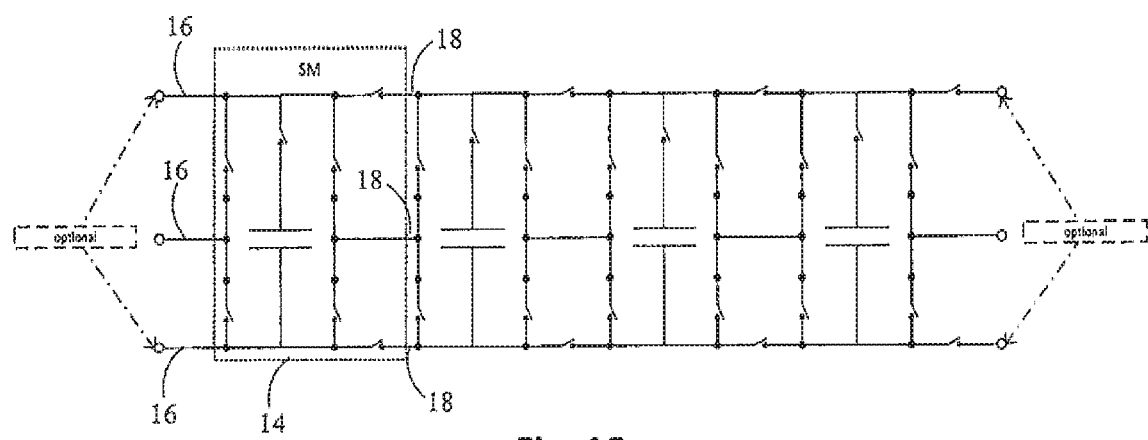
Figure 19:
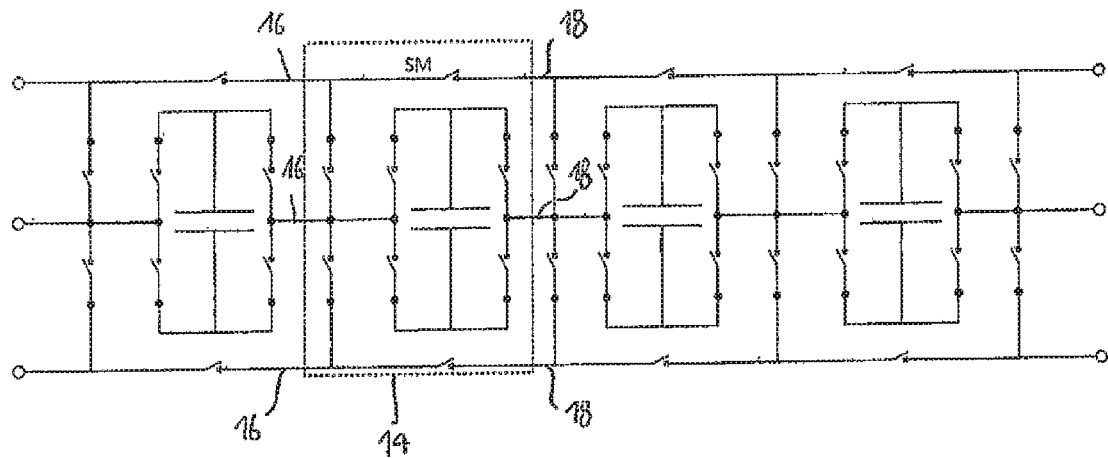
Figure 20:
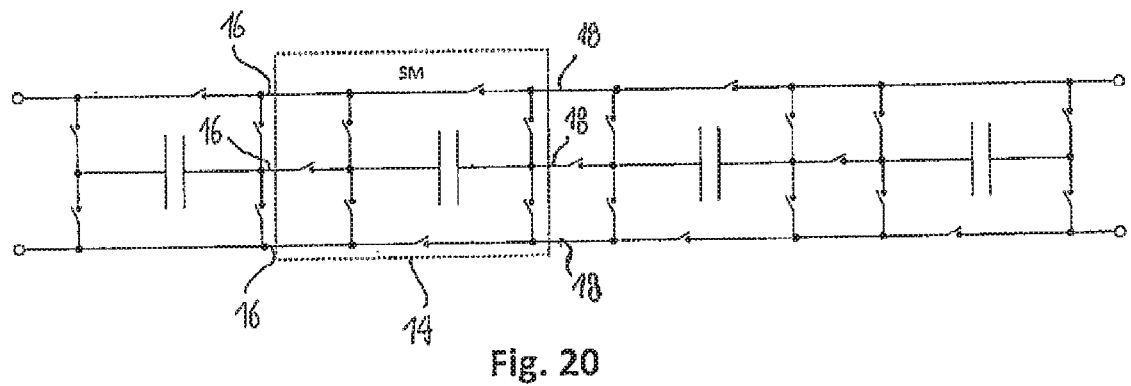
Figure 21:
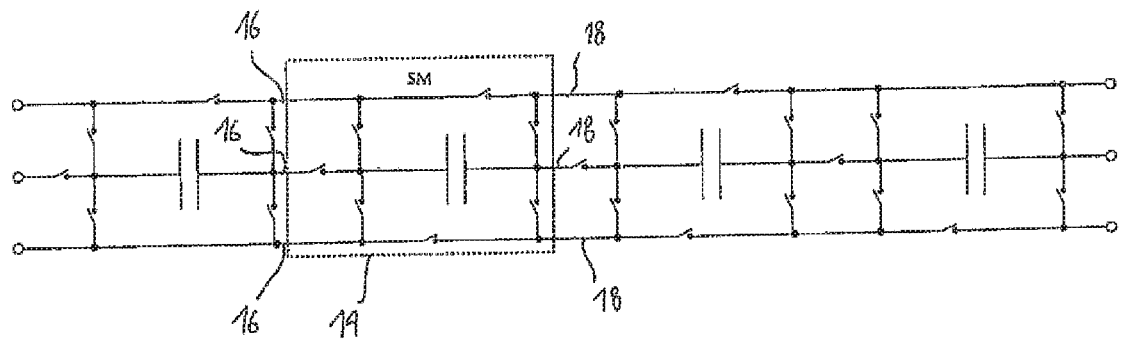
Figure 22:
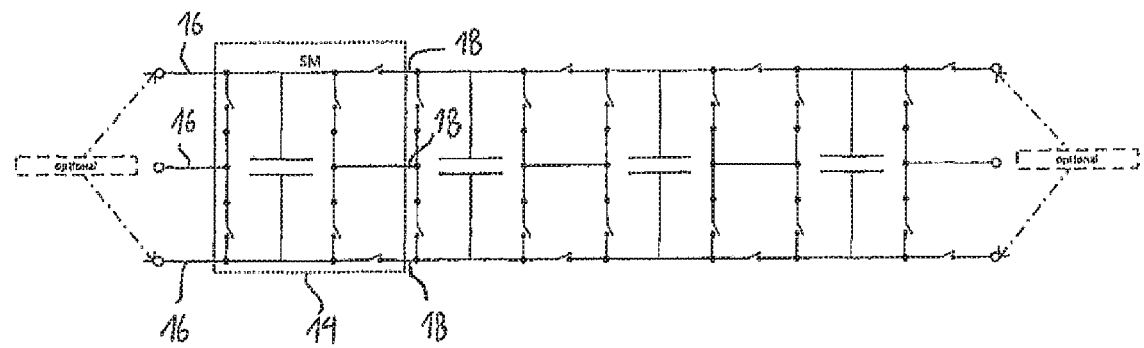

FIG. 17-22 show embodiments of four-quadrant modules, each having three first terminals 16 and three second terminals 18. Generalization to more than three first or second terminals is possible for the person skilled in the art in view of the principles presented herein. It is important to note that the SM 14 of FIG. 22, similarly to that of FIG. 16, on the basis of the switches 28 shown alone, is not capable of connecting in parallel SMs 14 that are separated by one or more deactivated SMs 14. The SMs 14 of FIGS. 16 and 17 are identical, with the exception of the first or last module in the chain.

Two-Quadrant Modules

Figure 23:
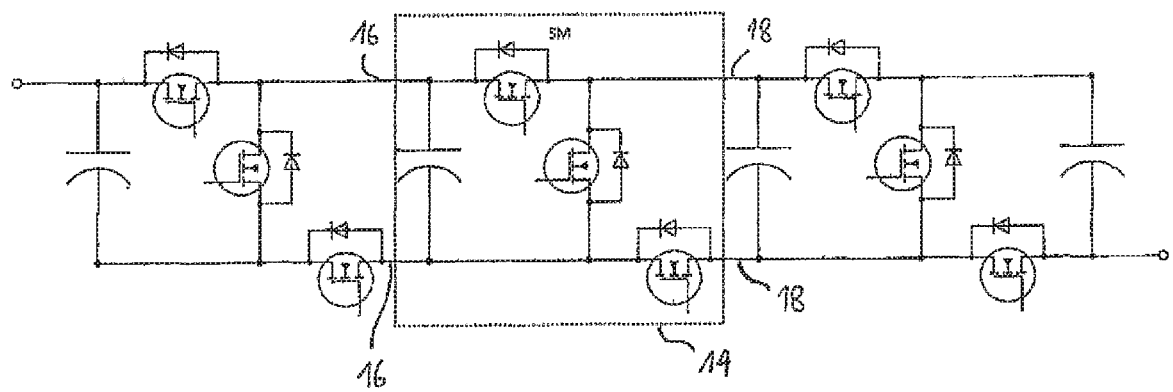
FIG. 23-24 show two-quadrant modules having two first and two second terminals.
Figure 24:
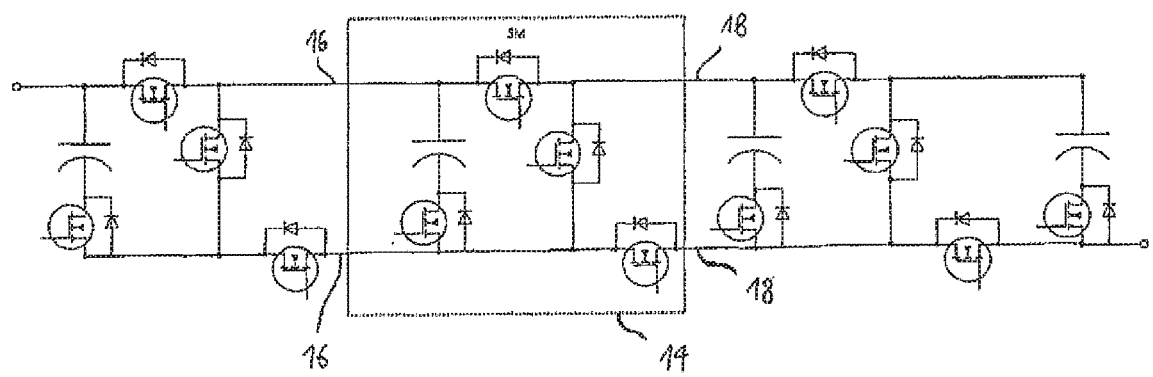

FIGS. 23 and 24 show exemplary embodiments of two-quadrant modules, each having two first and two second terminals 16, 18.

Figure 25:
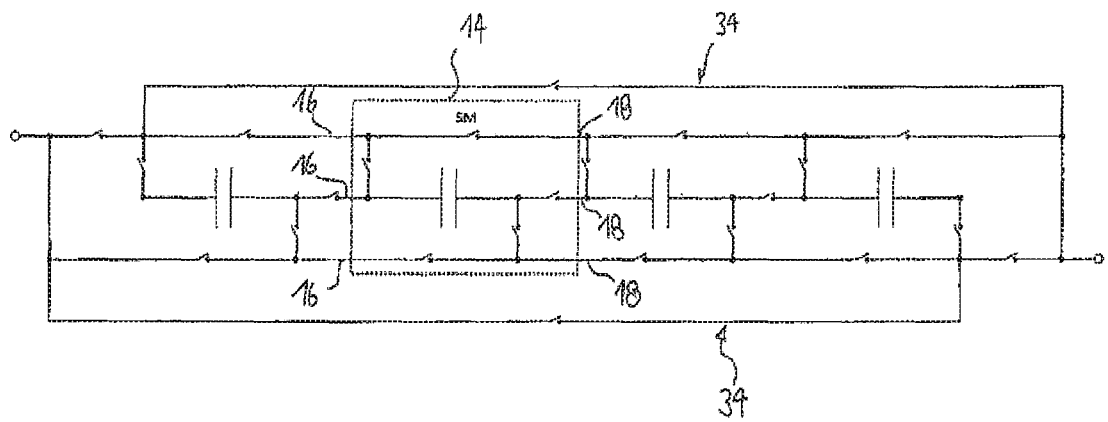
FIG. 25-26 show two-quadrant modules having three first and three second terminals and having an additional circuit for reversing the polarity of a series circuit of such modules.
Figure 26:
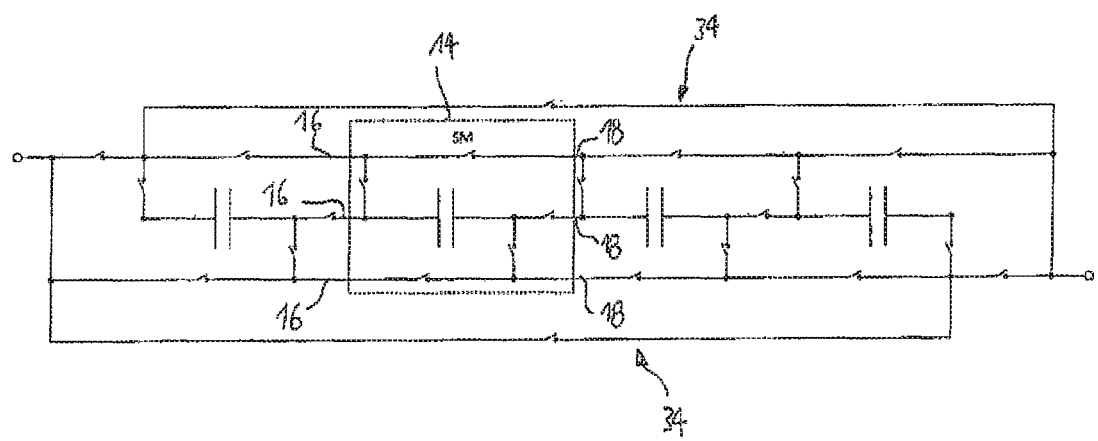

FIGS. 25 and 26 show exemplary embodiments of two-quadrant modules, each having three first and three second terminals 16, 18.

In order to provide the full functionality of the energy store converter system to, a chain of two-quadrant-modules can be reversed in polarity as a whole by means of an additional circuit 34, as shown in FIGS. 25 and 26.

The features of the invention disclosed in the description, the claims and the drawings can be essential to the implementation of the invention both individually and in any desired combination.

LIST OF REFERENCE NUMERALS

10 energy converter converter system
12 converter arm
14 module
16 first input
18 second input
20 control device
22 external terminal
24 inductance
26 storage element
28 switch
30 MOSFET
32 free-wheeling diode
34 polarity reversal circuit
40 ELV module
42 first terminal of the ELV module
44 second terminal of the ELV module
46 converter
48 input of the converter 46
50 output of the converter 46
52 energy store
54 rectifier
56 transformer
58 energy store
60 DC bus
62 battery
70 motor
72 charging connection
80-98 steps in the operation of an energy store converter system

The invention claimed is:

1. A modular energy store converter system, comprising:
a converter arm, which comprises a plurality of standard modules connected in series,
wherein a standard module of the plurality of standard modules comprises
a first terminal and a second terminal,
a storage element for electrical energy or an energy conversion element, and
a plurality of switches,
and
a control device, which
is configured to receive a signal regarding a current charge state of the storage elements or a voltage or an output power of the energy conversion elements, and
which is configured to actuate a switch of the plurality of switches depending on the current charge state of the storage elements or a current output power or voltage of the energy conversion elements in an energy supply mode or energy consumption mode, in such a way that the converter arm as a whole supplies a desired voltage,
wherein
the energy store converter system comprises an extra-low voltage module (ELV module),
wherein at least one of the following applies:
a first terminal of the ELV module is coupled to the second terminal of an adjacent standard module and
a second terminal of the ELV module is coupled to a first terminal of an adjacent standard module, and
wherein the ELV module comprises a converter with two inputs and two outputs, wherein the outputs of the converter are connected to cables,
wherein at least one of the following criteria (A), (B) applies:
(A) the standard modules and the ELV module are configured to be switched such that
in a first switching state the inputs of the converter are selectively interconnected serially or anti-serially to the storage element or energy conversion element of an adjacent standard module, and
in a second switching state the converter is decoupled from the storage element or energy conversion element,
and
(B) the standard modules and the ELV module are configured to be switched such that
in a first switching state the inputs of the converter are selectively interconnected in parallel to the storage element or energy conversion element of an adjacent standard module, and
in a second switching state the converter is decoupled from the storage element or energy conversion element.

2. The energy store converter system according to claim 1, in the operation of which a voltage is applied between the outputs of the converter of the ELV module, the voltage being lower than the voltage of the converter arm.

3. The energy store converter system according to claim 1, in which each standard module and the ELV module comprises at least two first terminals and at least two second terminals,
wherein in each two adjacent modules the first terminals of the one module are connected directly or via an intermediate component to the second terminals of the other module, and the standard modules and the ELV module are configured to be switched such that two storage elements or energy conversion elements or a storage element or energy conversion element and the converter in adjacent modules are connected either in series or in parallel.

4. The energy store converter system according to claim 3, wherein the standard modules are designed and configured to be controlled such that the storage elements or energy conversion elements of two standard modules, which are separated by at least one intermediate standard module with a deactivated storage element or energy conversion element, are selectively connected either in parallel or in series.

5. The energy store converter system according to claim 1, in which internal circuitry of the ELV module is designed identically to that of a standard module, except that instead of the energy storage or energy conversion element the converter is provided, wherein in the ELV module the inputs of the converter take the place of poles of the energy storage or energy conversion element of the standard module.

6. The energy store converter system according to claim 1, in which the converter of the ELV module is one of a DC/DC converter, a DC/AC converter and a rectifier.

7. The energy store converter system according to claim 1, in which the inputs of the converter of the ELV module are galvanically isolated from the outputs of the converter of the ELV module.

8. The energy store converter system according to claim 1, which comprises a plurality of ELV modules which are provided in different converter arms, wherein at least two ELV modules are provided in converter arms of separate converter systems and the ELV modules are connected to each other via the cables, so that a charge exchange between the separate converter systems via the cables is enabled.

9. The energy store converter system according to claim 1, which comprises a plurality of ELV modules, wherein the outputs of the respective converters of the plurality of ELV modules are connected in parallel with each other.

10. The energy store converter system according to claim 9, in which a DC voltage is applied at the other outputs of the converters of the plurality of ELV modules, and the outputs of the respective converters of the plurality of ELV modules are connected in parallel with a battery.

11. The energy store converter system according to claim 1, in which the ELV module comprises an energy store which is connected between the outputs of the converter of the ELV module.

12. The energy store converter system according to claim 1, in which the ELV module comprises an energy store which is connected between the inputs of the converter of the ELV module.

13. The energy store converter system according to claim 1, configured for transferring energy bi-directionality out of and into the converter-arm, wherein the energy stores of the standard modules of the converter arm are configured to be charged externally via the ELV module.

14. The energy store converter system according to claim 1, in which the control device is configured to
in a state in which energy is supplied from a converter arm, to connect the inputs of the converter of the ELV module anti-serially to energy-supplying storage elements in the standard modules of the converter arm,
in a state in which energy is fed into the converter arm, to connect the inputs of the converter of the ELV module serially to energy-consuming storage elements in the standard modules in the converter arm,
in a state in which neither energy is fed into the converter arm nor energy is supplied from the converter arm, to connect the inputs of the converter of the ELV module anti-serially to one or more storage elements in standard modules of the converter arm,
in a state in which neither energy is fed into the converter arm nor energy is supplied from the converter arm, to connect the inputs of the converter of the ELV module in parallel to one or more storage elements in standard modules of the converter arm, and
to superimpose a pulse width modulated signal (PWM) on the output voltage of the converter arm by switching between one of the serial or anti-serial mode of the ELV module and one of the parallel or decoupled mode of the ELV module.

15. The energy store converter system according to claim 1, in which the control device is configured for activating at least some switches of the plurality of switches in a charging mode based on one of the current state of charge of the storage elements and the current power output or voltage of the energy conversion elements, in order to charge at least some storage elements of the storage elements by means of an AC or DC voltage applied externally to the converter arm.

16. The energy store converter system according to claim 1, in which the storage element or energy conversion element of a standard module is configured to be deactivated by setting the switching states of its associated switches in a manner that at least one pole of the storage element or energy conversion element is not connected to either of the first or second terminals.

17. The energy store converter system according to claim 16, in which said pole of the storage element or energy conversion element is configured to be decoupled from the rest of the standard module by a corresponding switch.

18. The energy store converter system according to claim 1, in which the standard modules are configured to be operated in all four quadrants of a current-voltage plane.

19. The energy store converter system according to claim 1, in which the standard modules are configured to be operated in only two quadrants of a current-voltage plane, and in which an additional circuit is provided for inverting a polarity of a chain of two-quadrant modules connected in series as a whole.

20. The energy store converter system according to claim 18, in which the standard modules that are operable in said all four-quadrants are formed at least partly by a polarity-reversible chain of at least two two-quadrant modules.

21. The energy store converter system according to claim 1, in which at least two external terminals in one or both of the first and last modules of the converter arm are connected to each other.

22. The energy store converter system according to claim 1, which contains two, three, four, or five converter arms.

23. The energy store converter system according to claim 1, in which at least two external terminals in one or both of the first and last module of a converter arm are separately connected to at least two external terminals of a module of an adjoining converter arm.

24. The energy store converter system according to claim 22, in which the two, three, four, or five converter arms are interconnected in a star topology or in a ring topology.

25. The energy store converter system according to claim 23, in which the two, three, four, or five converter arms are interconnected in a ring topology in such a way that the at least two external terminals of each converter arm are separately connected to the at least two external terminals of the adjoining converter arm,
and in which the control device is configured to actuate at least a part of the plurality of switches in such a way that at least two mutually independent ring currents flow through the ring topology of converter arms.

26. The energy store converter system according to claim 1, in which the switches are formed by FETs, IGBTs, IGCTs or thyristors.

27. The energy store converter system according to claim 1, in which the storage elements are formed by one or more of the following elements:
- a capacitor,
- a battery cell,
- a redox flow cell.

28. The energy store converter system according to claim 1, in which the energy conversion elements comprise solar cells, fuel cells or thermocouples.

29. The energy store converter system according to claim 3, wherein the control device is configured for defining groups of standard modules, the storage elements of which are to be connected in parallel,
wherein the control device is configured to activate at least some of the plurality of switches depending on the current state of charge of the storage elements, in such a way that before the parallel connection of the storage elements of the standard modules of the group the voltages or charge states of the storage modules are aligned, by one or both of
standard modules or standard module sub-groups that have a lower voltage or lower charge state being preferentially charged during a charging operation, and
standard modules or standard module sub-groups that have a high voltage or a high charge state being preferentially discharged during an energy supply mode.

30. An electric drive for a vehicle, comprising
a modular energy store converter system according to claim 1,
a low-voltage on-board network, which is intended for supplying electrical power to occupants of the vehicle, wherein the low-voltage on-board network is supplied with energy via at least one ELV module of the energy store converter system.

31. The electric drive for a vehicle according to claim 30, in which the modular energy store converter system comprises three converter arms, which in operation each provide one phase of a three-phase supply of an electric motor.

32. A method for delivering a voltage from the modular energy store converter system according to claim 1, or for charging the storage elements of the standard modules of the modular energy store converter system according to claim 1, in which the standard modules and the ELV module are switched in such a way that a desired voltage to be delivered is present at the outputs of the converter, or that at least some of the storage elements of the standard modules are charged by a voltage which is present at the outputs of the converter of the ELV module, respectively.

33. The method according to claim 32, in which a voltage is present between the outputs of the converter of the ELV module, which is lower than the voltage of the converter arm.

34. The method according to claim 32, in which each standard module and the ELV module comprise at least two first terminals and at least two second terminals,
wherein in any two adjacent modules the first terminals of the one module are connected either directly or via an intermediate component to the second terminals of the other module,
and the standard modules and the ELV module in one switching state are switched such that two storage elements or energy conversion elements or one storage element or energy conversion element and the converter in adjacent modules are connected in series, and the standard modules and the ELV module in another switching state are switched such that two storage elements or energy conversion elements or one storage element or energy conversion element and the converter in adjacent modules are connected in parallel.

35. The method according to claim 34, wherein the standard modules are controlled such that the storage elements or energy conversion elements of two standard modules, which are separated by at least one intermediate standard module with a deactivated storage element/energy conversion element, are connected in parallel.

36. The method according to claim 32, in which a plurality of ELV modules are provided in different converter arms, and wherein the ELV modules are switched in such a way that a charge equalization is effected between the different converter arms via the cables.

37. The method according to claim 32, in which in a first operating state energy is decoupled from the converter arm by the ELV module, and in a second operating state energy is transferred into the converter arm by the ELV module to charge the energy store of the standard modules of the converter arm externally via the ELV module.

38. The method according to claim 32, comprising one or more of the following steps:
in a state in which energy is supplied from a converter arm, the inputs of the converter of the ELV module are connected anti-serially to energy-supplying storage elements in the standard modules of the converter arm,
in a state in which energy is fed into the converter arm, the inputs of the converter of the ELV module are connected serially to energy-consuming storage elements in the standard modules in the converter arm,
in a state in which neither energy is fed into the converter arm nor energy is supplied from the converter arm, the inputs of the converter of the ELV module are connected anti-serially to one or more storage elements in standard modules of the converter arm,
in a state in which neither energy is fed into the converter arm nor energy is supplied from the converter arm, the inputs of the converter of the ELV module are connected in parallel to one or more storage elements in standard modules of the converter arm, and
a PWM is superimposed on the output voltage of the converter arm by switching between the serial or anti-serial mode of the ELV module and the parallel or decoupled mode of the ELV module, wherein the switches of the ELV module are switched at a higher switching frequency than the switches of the standard modules.

39. The method according to claim 32, in which in a charging mode at least some of the storage elements are recharged by an AC or DC voltage applied externally to the converter arm.

40. The method according to claim 32, in which two, three, four, or five converter arms are interconnected in a ring topology in such a way that at least two external terminals of each converter arm are separately connected to at least two external terminals of the adjoining converter arm,
and in which standard modules are switched such that at least two mutually independent ring currents flow through the ring topology of converter arms.

41. The method according to claim 32, in which the modular energy store converter system is used in a drive for an electric vehicle and in which a low-voltage on-board network is supplied with energy via at least one ELV module of the energy store converter system, wherein the low-voltage on-board network is used for supplying consumers of the electric vehicle.

42. The method according to claim 41, in which the energy store of the modular energy store converter system is charged via the on-board network and the at least one ELV module.

\* \* \* \* \*